US012773688B2

(12) United States Patent
Schoenhaber et al.

(10) Patent No.: US 12,773,688 B2
(45) Date of Patent: Oct. 27, 2026

(54) CATALYTICALLY ACTIVE PARTICLE FILTER WITH A HIGH DEGREE OF FILTRATION EFFICIENCY

(71) Applicant: UMICORE AG & CO. KG, Hanau-Wolfgang (DE)

(72) Inventors: Jan Schoenhaber, Darmstadt (DE); Gabriela Kucerova, Senden (DE); Naina Deibel, Pfungstadt (DE); Meike Antonia Gotthardt, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 599 days.

(21) Appl. No.: 18/256,389

(22) PCT Filed: Dec. 14, 2021

(86) PCT No.: PCT/EP2021/085633

§ 371 (c)(1),
(2) Date: Jun. 7, 2023

(87) PCT Pub. No.: WO2022/129010

PCT Pub. Date: Jun. 23, 2022

(65) Prior Publication Data

US 2024/0109060 A1 Apr. 4, 2024

(30) Foreign Application Priority Data

Dec. 15, 2020 (EP) .................................... 20214153

(51) Int. Cl.
*B01J 35/00* (2024.01)
*B01D 53/94* (2006.01)
(Continued)

(52) U.S. Cl.
CPC ............ *B01J 35/19* (2024.01); *B01D 53/945* (2013.01); *B01D 53/9472* (2013.01);
(Continued)

(58) Field of Classification Search
None
See application file for complete search history.

(56) References Cited

U.S. PATENT DOCUMENTS 4,609,563 A 9/1986 Shimrock et al.
6,478,874 B1 11/2002 Rosynsky et al.
(Continued)

FOREIGN PATENT DOCUMENTS

CN 102781586 A 11/2012
CN 108350777 A 7/2018
(Continued)

OTHER PUBLICATIONS

International Food Information Service. (2009). Dictionary of Food Science and Technology (2nd Edition)—Minerals. International Food Information Service (IFIS Publishing). Retrieved from https://app.knovel.com/hotlink/pdf/id:kt006QDW52/dictionary-food-science/minerals. (Year: 2009).*
(Continued)

*Primary Examiner* — Anthony J Zimmer
*Assistant Examiner* — Zachary John Baum
(74) *Attorney, Agent, or Firm* — Smith, Gambrell & Russell, LLP

(57) ABSTRACT

The present invention relates to a wall-flow filter for removing particles from the exhaust gas of combustion engines, comprising a wall-flow filter substrate of length L and coatings Z and F that differ from one another, wherein the wall-flow filter substrate has channels E and A, which extend in parallel between a first and a second end of the wall-flow filter substrate, are separated by porous walls and form surfaces $O_E$ and $O_A$ respectively, and wherein the channels E are closed at the second end and the channels A are closed at the first end, and wherein (Continued)

Figure 1:
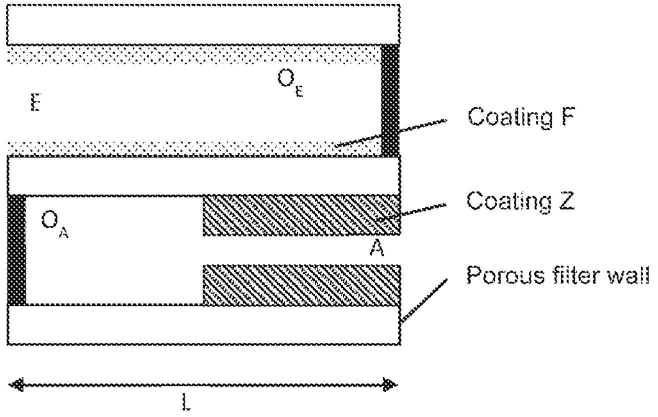

the coating Z is located in the porous walls and/or on the surfaces $O_A$, but not on the surfaces $O_E$, and comprises palladium and/or rhodium a cerium/zirconium mixed oxide, characterized in that the coating F is located in the porous walls and/or on the surfaces $O_E$, but not on the surfaces $O_A$ and comprises a particulate metal compound and no noble metal.

21 Claims, 6 Drawing Sheets

(51) Int. Cl.

| | |
|---|---|
| ***B01J 23/42*** | (2006.01) |
| ***B01J 23/44*** | (2006.01) |
| ***B01J 23/63*** | (2006.01) |
| ***B01J 35/57*** | (2024.01) |
| ***B01J 37/02*** | (2006.01) |
| ***F01N 3/035*** | (2006.01) |

(52) U.S. Cl.

CPC ............... *B01J 23/42* (2013.01); *B01J 23/44* (2013.01); *B01J 23/63* (2013.01); *B01J 35/57* (2024.01); *B01J 37/0215* (2013.01); *F01N 3/035* (2013.01); *B01D 2255/1023* (2013.01); *B01D 2255/1025* (2013.01); *B01D 2255/2061* (2013.01); *B01D 2255/2063* (2013.01); *B01D 2255/2066* (2013.01); *B01D 2255/2092* (2013.01); *B01D 2255/407* (2013.01); *B01D 2255/9035* (2013.01); *B01D 2255/905* (2013.01); *B01D 2255/908* (2013.01); *B01D 2255/9155* (2013.01); *B01D 2257/404* (2013.01); *B01D 2257/502* (2013.01); *B01D 2257/702* (2013.01); *B01D 2258/012* (2013.01); *F01N 2510/068* (2013.01)

(56) References Cited

U.S. PATENT DOCUMENTS

| | | | |
|---|---|---|---|
| 6,548,105 B2 | 4/2003 | Kiessling et al. | |
| 8,277,880 B2 | 10/2012 | Sato et al. | |
| 8,388,721 B2 | 3/2013 | Ishizawa | |
| 8,663,587 B2 | 3/2014 | Boorse | |
| 8,802,016 B2 | 8/2014 | Grubert | |
| 9,764,287 B2 * | 9/2017 | Goffe | B01J 29/068 |
| 10,150,082 B2 | 12/2018 | Yoshikawa | |
| 10,233,803 B2 | 3/2019 | Sumiya et al. | |
| 10,989,082 B2 | 4/2021 | Takizawa et al. | |
| 11,364,489 B2 | 6/2022 | Makino et al. | |
| 11,441,459 B2 | 9/2022 | Deibel et al. | |
| 11,566,548 B2 | 1/2023 | Foerster et al. | |
| 2006/0287193 A1 | 12/2006 | Tsuji et al. | |
| 2007/0217978 A1 | 9/2007 | Baican et al. | |
| 2008/0107806 A1 | 5/2008 | Mergner et al. | |
| 2010/0275579 A1 * | 11/2010 | Klingmann | B01J 37/0244 422/310 |
| 2011/0030346 A1 | 2/2011 | Neubauer et al. | |
| 2011/0252773 A1 | 10/2011 | Arnold et al. | |
| 2013/0149220 A1 * | 6/2013 | Swallow | B01D 53/9472 502/74 |
| 2020/0368727 A1 * | 11/2020 | Schmitz | F01N 3/28 |
| 2021/0396167 A1 * | 12/2021 | Foerster | C04B 35/195 |
| 2024/0017213 A1 | 1/2024 | Schoenhaber et al. | |
| 2024/0033687 A1 | 2/2024 | Schoenhaber et al. | |
| 2024/0100478 A1 | 3/2024 | Schoenhaber et al. | |

FOREIGN PATENT DOCUMENTS

| | | | |
|---|---|---|---|
| CN | 111511469 | A | 8/2018 |
| CN | 108979798 | A | 12/2018 |
| DE | 102006061693 | A1 | 7/2008 |
| DE | 202017007047 | U1 | 4/2019 |
| DE | 102018127955 | A1 | 5/2020 |
| EP | 1 064 094 | B1 | 1/2001 |
| EP | 1 136 462 | B1 | 8/2004 |
| EP | 1 716 903 | A1 | 11/2006 |
| EP | 2 415 522 | A1 | 2/2012 |
| EP | 2 502 661 | A2 | 9/2012 |
| EP | 2 554 262 | A1 | 2/2013 |
| EP | 2 521 618 | B1 | 8/2013 |
| EP | 2 727 640 | A1 | 5/2014 |
| EP | 2 502 662 | B1 | 6/2014 |
| EP | 2 889 083 | A1 | 7/2015 |
| EP | 1 789 190 | B1 | 6/2017 |
| EP | 3 574 983 | A2 | 12/2019 |
| EP | 2 723 476 | B1 | 7/2020 |
| JP | H01-151706 | | 6/1989 |
| JP | 5378659 | B2 | 12/2013 |
| JP | 2014-205108 | A | 10/2014 |
| WO | 99/47260 | A1 | 9/1992 |
| WO | 2005/016497 | A1 | 2/2005 |
| WO | 2010/015573 | A2 | 2/2010 |
| WO | 2011/151711 | A1 | 12/2011 |
| WO | 2012/030534 | A1 | 3/2012 |
| WO | 2013/070535 | A1 | 5/2013 |
| WO | 2017/103855 | A1 | 6/2017 |
| WO | 2017/109514 | A1 | 6/2017 |
| WO | 2018/115900 | A1 | 6/2018 |
| WO | 2019/211373 | A1 | 11/2019 |
| WO | 2020/071389 | A1 | 4/2020 |
| WO | 2020094760 | A1 † | 5/2020 |
| WO | 2022/129014 | A1 | 6/2023 |
| WO | 2022/129023 | A1 | 6/2023 |
| WO | 2022/129027 | A1 | 6/2023 |

OTHER PUBLICATIONS

U.S. Appl. No. 18/256,398, 2024/0017213 A1.
U.S. Appl. No. 18/256,407, 2024/0100478 A1.
U.S. Appl. No. 18/256,412, 2024/0033687 A1.
U.S. Appl. No. 18/256,398, filed Jun. 7, 2023, Schoenhaber, et al.
U.S. Appl. No. 18/256,407, filed Jun. 7, 2023, Schoenhaber, et al.
U.S. Appl. No. 18/256,412, filed Jun. 7, 2023, Schoenhaber, et al.
International Search Report dated Mar. 28, 2022 for International Patent Application No. PCT/EP2021/085633 (4 Pages in German, 2 pages English translation).
Written Opinion of the International Searching Authority dated Mar. 28, 2022 for International Patent Application No. PCT/EP2021/085633 (5 Pages in German, 4 pages English translation).
International Preliminary Report on Patentability dated Jun. 13, 2023 for International Patent Application No. PCT/EP2021/085633 (6 Pages in German, 5 pages English translation).
Extended European Search Report mailed Jun. 7, 2021 for European Patent Application No. 20214153.7 (7 pages in German; 4 pages English translation).
DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German with English machine translation.
DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).
DIN 66134. Feb. 1998, Bestimmung der Porengrößenverteilung und der spezifischen Oberfläche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).
ISO 11465—Soil Quality—Determination of dry matter and water content on a mass basis—Gravimetric Method. 1993 (8 pages).

(56) References Cited

OTHER PUBLICATIONS

ISO 13320: 2009(E). Particle size analysis—Laser diffraction Methods (60 pages). 60 pages.
Aerosolgeneratoren Und-Dispergierer. accessed May 7, 2018. http://www.tsi.com/Aerosolgeneratoren-und-dispergierer/ (3 pages in German with English translation).
Pyrogenes Siliciumdioxid. Wikipedia. Accessed Nov. 16, 2018. https://de.wikipedia.org/w/index.php?title=Pyrogenes_Siliciumdioxid&oldid=182147815. 5 Pages.
Aerosolgernatoren fur Feststoffe. Accessed May 7, 2018. https://www.palas.de/de/product/aerosolgeneratorssolidparticles (2 pages in German with English translation).
Albers, P., et al. Kristallin und amorph Sand als Rohstoff. [Crystalline and amorphous sand as a raw material]. Chemie in unserer Zeit, 2016, vol. 50, pp. 162-171 (in German with English translation).
Benard, H. Comptes rendus hebdomadaires des séances de l'Académie des sciences/publiés . . . par MM. les secrétaires perpétuels. [Weekly reports of the sessions of the Academy of Sciences / published . . . by MM. perpetual secretaries] C. R. Acad. Sci. Paris Ser. IV 147, pp. 839-842. (1908). (In French with English translation).
Ferkel, H., et al. Edelmetallfreie Nanokatalysatoren Für Dieselpartikelfilter [Non-Metal-Free Nanocatalysts for diesel Particulate Filters]. MTZ—Motortechnische Zeitschrift, 2010, vol. 71, pp. 128-133. In German with English translation.
Gutsch, A. et al. Gas-Phase Production of Nanoparticles. KONA. 2002. No. 20. 14 pages.
Hall, D.E., et al., Measurement of the Number of Siz Distribution of Particles Emitted from a Gasoline Direct Injection Vehicle. SAE. 1999-01-3530. pp. 1-11.
Hinds, W.C. Aerosol technology: Properties, behavior and measurement of airborne particles. Wiley, 2nd edition. 1999. 200 Pages.
Karman, T. von. Ueber den Mechanismus des Widerstandes, den ein bewegter Körper in einer Flüssigkeit erfährt [About the mechanism of resistance a moving body experiences in a liquid] Nachr. Ges. Wiss. Göttingen, Math. Phys. Kl. 1911. pp. 509-517. (In German with English Translation).
Li S., et al. Flame aerosol synthesis of nanostructured materials and functional devices: Processing, modeling, and diagnostics. Progress in Energy and Combustion Science (55). 2016. pp. 1-59.
Maricq, M.M., et al., Particulate Emissions from a Direct-Injection Spark-Ignition (DISI) Engine. SAE. 1999-01-1530. 1999. pp. 1-9.
Mathis. U., et al., TEM analysis of volatile nanoparticles from particle trap equipped diesel and direct-injection spark-ignition vehicles. Atmospheric Environment. vol. 38. pp. 4347-4355.
Siebler, Von Johann, et al. MTZ Motortechnische Zeitschrift [Katalysatorprüfung] 1994, 55, pp. 214-218.
Stieß, M. Mechanical Process Engineering—Particle Technology 1, Springer, 3rd edition 2009. Kapitel 2. Kennzeichnungen von Partikeln und dispersen Stoffsystemen [Chapter 2 Identification of particles and disperse Substance systems] pp. 9-95 (e.g., pp. 16, 29, 35) (in German with English translation).
Ulrich, G. Theory of Particle Formation and Growth in Oxide Synthesis Flames. Combustion Science and Technology. 1971. vol. 4. pp. 47-57.
US Non Final Office Action mailed Mar. 2, 2026 for U.S. Appl. No. 18/256,407 (10 Pages).
US Non Final Office Action mailed Feb. 11, 2026 for U.S. Appl. No. 18/256,398 (12 Pages).
First Office Action mailed Dec. 24, 2025 in Chinese Patent Application No. 202180084071.2 (5 pages in Chinese; 8 pages English translation; 2 pages search report).
Non Final Office Action mailed Jan. 7, 2026 for U.S. Appl. No. 18/256,412 (14 pages).
Second Office Action mailed Jun. 2, 2026 in Chinese Patent Application No. 202180084071.2 (6 pages in Chinese; 8 pages in English).
Second Office Action mailed Jun. 3, 2026 in Chinese Patent Application No. 202180081691.0 (5 pages in Chinese; 8 pages English translation; 1 page Search Report).
Final Office Action mailed Jun. 30, 2026 for U.S. Appl. No. 18/256,407 (9 pages).
Final Office Action mailed Jul. 29, 2026 for U.S. Appl. No. 18/256,398 (7 pages).

* cited by examiner
† cited by third party

CATALYTICALLY ACTIVE PARTICLE FILTER WITH A HIGH DEGREE OF FILTRATION EFFICIENCY

The present invention relates to a wall-flow filter, to a method for the production thereof and the use thereof for reducing harmful exhaust gases of an internal combustion engine.

Diesel particulate filters or gasoline particulate filters with and without an additional catalytically active coating are suitable aggregates for removing particle emissions and reducing harmful substances in exhaust gases. These are wall-flow honeycomb bodies, which are referred to as catalyst supports, carriers or substrate monoliths. In order to meet the legal standards, it is desirable for current and future applications for the exhaust gas aftertreatment of internal combustion engines to combine particulate filters with other catalytically active functionalities not only for reasons of cost but also for installation space reasons. The catalytically active coating can be located on the surface or in the walls of the channels forming this surface. The catalytically active coating is often applied to the catalyst support in the form of a suspension in a so-called coating operation. Many such processes have been published in the past by automotive exhaust-gas catalyst manufacturers; see, for example, EP1064094B1, EP2521618B1, WO10015573A2, EP1136462B1, U.S. Pat. No. 6,478,874B1, U.S. Pat. No. 4,609,563A, WO9947260A1, JP5378659B2, EP2415522A1, and JP2014205108A2.

The use of a particulate filter, whether catalytically coated or not, leads to a noticeable increase in the exhaust-gas back pressure in comparison with a flow-through support of the same dimensions and thus to a reduction in the torque of the engine or possibly to increased fuel consumption. In order to not increase the exhaust-gas back pressure even further, the amounts of oxidic support materials for the catalytically active noble metals of the catalyst or oxidic catalyst materials are generally applied in smaller quantities in the case of a filter than in the case of a flow-through support. As a result, the catalytic effectiveness of a catalytically coated particulate filter is frequently inferior to that of a flow-through monolith of the same dimensions.

There have already been some efforts to provide particulate filters that have good catalytic activity due to an active coating and yet have the lowest possible exhaust-gas back pressure. With regard to a low exhaust-gas back pressure, it has proven to be expedient if the catalytically active coating is not present as a layer on the channel walls of a porous wall-flow filter, but the channel walls of the filter are instead interspersed with the catalytically active material; see, for instance, WO2005016497A1, JPH01-151706, and EP1789190B1. For this purpose, the particle size of the catalytic coating is selected such that the particles penetrate into the pores of the wall-flow filters and can be fixed there by calcination. A disadvantage of catalytically active filters having an in-wall coating is that the amount of catalytically active substance is limited by the absorption capacity of the porous wall.

It has been found that, by applying the catalytically active substances to the surfaces of the channel walls of a wall-flow honeycomb body, an increase in the conversion of the harmful substances in the exhaust gas can be achieved. Combinations of on-wall coating and in-wall coating with catalytically active material are also possible, as a result of which the catalytic performance can be further increased without substantially increasing the back pressure.

In addition to the catalytic effectiveness, a further functionality of the filter that can be improved by a coating is its filtration efficiency, i.e., the filtering effect itself. WO 2011151711A1 describes a method by means of which a dry aerosol is impinged on a non-coated or catalytically coated filter that carries the catalytically active material in the channel walls (in-wall coating with a washcoat). The aerosol is provided by the distribution of a powdered high-melting metal oxide and is guided through the inlet side of a wall-flow filter by means of a gas stream. In this case, the individual particles having a particle size of 0.2 μm to 5 μm agglomerate to form a bridged network of particles and are deposited as a layer on the surface of the individual inlet channels passing through the wall-flow filter. The typical powder loading of a filter is between 5 g and 50 g per liter of filter volume. It is expressly pointed out that it is not desirable to obtain a coating inside the pores of the wall-flow filter with the metal oxide.

A further method for increasing the filtration efficiency of catalytically inactive filters is described in WO2012030534A1. In this case, a filtration layer ("discriminating layer") is created on the walls of the flow channels of the inlet side by the deposition of ceramic particles via a particle aerosol. The layers consist of oxides of zirconium, aluminum, or silicon, preferably in fiber form ranging from 1 nm to 5 μm in length, and have a layer thickness greater than 10 μm, typically 25 μm to 75 μm. After the coating process, the applied powder particles are calcined in a thermal process.

A further method in which a membrane ("trapping layer") is produced on the surfaces of the inlet channels of filters in order to increase the filtration efficiency of catalytically inactive wall-flow filters is described in patent specification U.S. Pat. No. 8,277,880B2. The filtration membrane on the surfaces of the inlet channels is produced by sucking through a gas stream loaded with ceramic particles (for example, silicon carbide or cordierite). After application of the filter layer, the honeycomb body is fired at temperatures greater than 1000° C. in order to increase the adhesive strength of the powder layer on the channel walls. EP2502661A2 and EP2502662B1 mention further on-wall coatings by powder application.

Coating inside the pores of a wall-flow filter substrate by spraying dry particles is described in U.S. Pat. No. 8,388,721 B2. In this case, however, the powder should penetrate deeply into the pores. 20% to 60% of the surface of the wall should remain accessible to soot particles, thus open. Depending on the flow velocity of the powder/gas mixture, a more or less steep powder gradient between the inlet and outlet sides can be adjusted. The pores of the channel walls of the filter coated with powder in the pores according to U.S. Pat. No. 8,388,721 B2 can subsequently be coated with a catalytically active component. Here as well, the catalytically active material is located in the channel walls of the filter.

The introduction of the powder into the pores, for example by means of an aerosol generator, is also described in EP2727640A1. Here, a non-catalytically coated wall-flow filter is coated using a gas stream containing, for example, aluminum oxide particles in such a way that the complete particles, which have a particle size of 0.1 μm to 5 μm, are deposited as a porous filling in the pores of the wall-flow filter. The particles themselves can realize a further functionality of the filter in addition to the filtering effect. For example, these particles are deposited in the pores of the filter in an amount greater than 80 g/l based on the filter volume. They fill in 10% to 50% of the volume of the filled pores in the channel walls. This filter, both loaded with soot and without soot, has an improved filtration efficiency compared to the untreated filter together with a low exhaust-gas back pressure of the soot-loaded filter.

In WO2018115900A1, wall-flow filters are coated with an optionally dry synthetic ash in such a way that a continuous membrane layer is formed on the walls of the optionally catalytically coated wall-flow filter.

All of the prior art patents listed above have the aim of increasing the filtration efficiency of a filter by coating the filter with a powder. The filters optimized in this way can also carry a catalytically active coating in the porous channel walls before the powder coating. However, there are no indications in any of the examples to simultaneously optimize the catalytic effect of a filter and increase filtration efficiency.

Therefore, there continues to be a need for particulate filters with which both catalytic activity and filtration efficiency are optimized with respect to exhaust-gas back pressure. The object of the present invention is to provide a corresponding particulate filter with which a sufficient filtration efficiency is coupled with the lowest possible increase in the exhaust-gas back pressure and a high catalytic activity.

These and other objects which are obvious from the prior art are achieved by a particulate filter according to claims 1 to 14. Claim 15 is directed to the production of a particulate filter according to the invention. Claim 16 is directed to the use of the particulate filter for the exhaust-gas aftertreatment of internal combustion engines.

The present invention relates to a wall-flow filter for removing particles from the exhaust gas of combustion engines, comprising a wall-flow filter substrate of length L and coatings Z and F that differ from one another,

- wherein the wall-flow filter substrate has channels E and A, which extend in parallel between a first and a second end of the wall-flow filter substrate, are separated by porous walls and form surfaces $O_E$ and $O_A$ respectively, and
- wherein the channels E are closed at the second end and the channels A are closed at the first end, and
- wherein the coating Z is located in the porous walls and/or on the surfaces $O_A$, but not on the surfaces $O_E$, and comprises palladium and/or rhodium and a cerium/zirconium mixed oxide,
- characterized in that the coating F is located in the porous walls and/or on the surfaces $O_E$, but not on the surfaces $O_A$, and comprises a particulate metal compound and no noble metal.

In the intended use of the wall-flow filter according to the invention for cleaning exhaust gas of internal combustion engines, the exhaust gas flows into the filter at one end and leaves it again after passing through the porous walls at the other end. Therefore, if the exhaust gas enters the filter at the first end, for example, the channels E denote the inlet channels or inflow-side channels. After passing through the porous walls, it then exits the filter at the second end, such that the channels A denote the outlet channels or outflow-side channels.

All ceramic wall-flow filter substrates known from the prior art and customary in the field of automobile exhaust gas catalysis can be used as wall-flow substrates. Porous wall-flow filter substrates made of cordierite, silicon carbide, or aluminum titanate are preferably used. These wall-flow filter substrates have channels E and channels A which, as described above, act as inlet channels, which can also be called inflow channels, and as outlet channels, which can also be called outflow channels. The outflow-side ends of the inflow channels and the inflow-side ends of the outflow channels are closed off from one another in an offset manner with generally gas-tight "plugs". In this case, the exhaust gas that is to be purified and that flows through the filter substrate is forced to pass through the porous wall between the inflow channel and outflow channel, which brings about a particulate filtering effect. The filtration property for particulates can be designed by means of the porosity, pore/radii distribution, and thickness of the wall. According to the invention, the porosity of the uncoated wall-flow filter substrates is typically more than 40%, for example from 40% to 75%, particularly from 50% to 70% [measured according to DIN 66133, latest version on the filing date]. The average pore size $d_{50}$ of the uncoated wall-flow filter substrates is at least 7 μm, for example from 7 μm to 34 μm, preferably more than 10 μm, in particular more preferably from 10 μm to 25 μm or most preferably from 15 μm to 20 μm [measured according to DIN 66134, latest version on the filing date], wherein the $d_{50}$ value of the pore size distribution of the wall-flow filter substrate is understood to mean that 50% of the total pore volume determinable by mercury porosimetry is formed by pores whose diameter is less than or equal to the value specified as $d_{50}$. In the case of the wall-flow filters according to the invention, the wall-flow filter substrates provided with the coatings Z and F and optionally coating Y (see below) particularly preferably have a pore size $d_{50}$ from 10 μm to 20 μm and a porosity from 50% to 65%.

It is known to the person skilled in the art that, due to the plugs closing off the channels E and A from one another in an offset manner, the entire length L of the wall-flow filter substrate may not be available for coating. For example, the channels E are closed at the second end of the wall-flow filter substrate, such that the surface $O_E$ available for coating can consequently be slightly smaller than the length L. This, of course, only applies if a coating is present on 100% of the length L or slightly below. In these cases, for the sake of simplicity, 100% of the length L is still referred to below.

If the coating Z is located on the surfaces $O_A$ of the wall-flow filter substrate, it preferably extends from the second end of the wall-flow filter substrate to 50 to 90% of the length L.

The coating on the surfaces $O_A$ is a so-called on-wall coating. This means that the coating rises above the surfaces $O_A$ into the channels A of the wall-flow filter substrate, thus reducing the channel cross section. In this embodiment, the pores of the porous wall which are adjacent to the surfaces $O_A$ are filled with the coating Z only to a minor extent. More than 80%, preferably more than 90%, of the coating Z is not located in the porous wall.

On-wall coatings have a certain elevation above the wall surface. However, the thickness of the layers Z and Y is generally 5-250 μm, preferably 7.5-225 μm and most preferably 10-200 μm, wherein the thickness of the layer is preferably determined in the middle of a respective channel web and not in the corners. Standard analytical methods known to the person skilled in the art, such as scanning electron microscopy, are suitable for determining the layer thickness.

If the coating Z is located in the porous walls of the wall-flow filter substrate, it preferably extends from the first end of the wall-flow filter substrate to 50 to 100% of the length L.

The coating in the porous walls is a so-called in-wall coating. In this embodiment, the surfaces $O_A$ adjacent to the porous walls are coated with the coating Z only to a minor extent.

The minimum length of the coating Z is at least 1.25 cm, preferably at least 2.0 cm and most preferably at least 2.5 cm, calculated from the second end of the wall-flow filter substrate.

The coating Z can have a thickness gradient over the length L such that the thickness of the coating Z increases along the length L of the wall-flow filter from the second end towards the first end. In this case, the coating may preferably have more than 2 times, more preferably up to more than 3 times the thickness at one coating end than at the other coating end. In this case, the thickness is the height at which the coating Z rises above the surface $O_A$. The thickness gradient of the coating on the channel walls also makes it possible for the filtration efficiency to be adjusted over the entire length L of the filter. The result is a more uniform deposition of the soot over the entire filter wall and thus an improved exhaust-gas back pressure increase and possibly a better burn-off of the soot.

However, the coating Z can also have a thickness gradient over the length L such that the thickness of the coating Z decreases along the length L of the wall-flow filter from the second end towards the first end. In this case, the coating may preferably have more than 2 times, more preferably up to more than 3 times the thickness at one coating end than the other coating end. In this case, the thickness is the height at which the coating Z rises above the surface $O_A$. The thickness gradient of the coating on the channel walls also makes it possible for the filtration efficiency to be adjusted over the entire length L of the filter. The result is a more uniform deposition of the soot over the entire filter wall and thus an improved exhaust-gas back pressure increase and possibly a better burn-off of the soot.

The coating Z is a catalytically active coating in particular due to the constituents palladium and/or rhodium. In the context of the present invention, "catalytically active" is understood to mean the ability to convert harmful constituents of the exhaust gas from internal combustion engines into less harmful ones. The exhaust gas constituents $NO_x$, CO, and HC should be mentioned here in particular. Consequently, coating Z is particularly preferably three-way catalytically active, in particular at operating temperatures of 250 to 1100° C.

Coating Z contains the noble metals palladium and/or rhodium, with platinum also being present as a further noble metal only in exceptional cases. Particularly preferably, coating Z contains palladium and rhodium and no platinum.

In another embodiment, coating Z contains the noble metals platinum and/or rhodium, with palladium also being present as a further noble metal only in exceptional cases.

In a further embodiment, coating Z contains the noble metals platinum and palladium and optionally rhodium. In this embodiment, it is advantageous if the mass ratio of platinum to palladium is 15:1 to 1:15, in particular 10:1 to 1:10.

Based on the particulate filter according to the invention, the proportion of rhodium in the entire noble metal content is in particular greater than or equal to 5% by weight, preferably greater than or equal to 10% by weight. For example, the proportion of rhodium in the total noble metal content is 5 to 20% by weight or 5 to 15% by weight. The noble metals are usually used in quantities of 0.10 to 5 g/l based on the volume of the wall-flow filter substrate.

The noble metals are usually fixed on one or more carrier materials. All materials that are familiar to the person skilled in the art for this purpose are considered as support materials. Such materials are in particular metal oxides with a BET surface area of 30 to 250 $m^2/g$, preferably 100 to 200 $m^2/g$ (determined according to DIN 66132, latest version as of filing date). Particularly suitable carrier materials for the noble metals are selected from the series consisting of aluminum oxide, doped aluminum oxide, silicon oxide, titanium dioxide and mixed oxides of one or more thereof. Doped aluminum oxides are, for example, aluminum oxides doped with lanthanum oxide, zirconium oxide, barium oxide and/or titanium oxide. Aluminum oxide or lanthanum-stabilized aluminum oxide is advantageously used, wherein lanthanum is used in quantities of 1 to 10% by weight, preferably 3 to 6% by weight, in each case calculated as $La_2O_3$ and based on the weight of the stabilized aluminum oxide.

Also in the case of aluminum oxide doped with barium oxide, the proportion of barium oxide is in particular 1 to 10% by weight, preferably 3 to 6% by weight, in each case calculated as BaO and based on the weight of the stabilized aluminum oxide.

Another suitable carrier material is lanthanum-stabilized aluminum oxide the surface of which is coated with lanthanum oxide, with barium oxide and/or with strontium oxide.

Coating Z preferably comprises at least one aluminum oxide or doped aluminum oxide.

Coating Z contains at least one cerium/zirconium mixed oxide that acts as an oxygen storage component. The mass ratio of cerium oxide to zirconium oxide in these products can vary within wide limits. It is, for example, 0.1 to 1.5, preferably 0.15 to 1 or 0.2 to 0.9.

Preferred cerium/zirconium mixed oxides comprise one or more rare earth metal oxides and can thus be referred to as cerium/zirconium/rare earth metal mixed oxides. The term "cerium-zirconium-rare-earth metal mixed oxide" within the meaning of the present invention excludes physical mixtures of cerium oxide, zirconium oxide, and rare earth oxide. Rather, "cerium/zirconium/rare earth metal mixed oxides" are characterized by a largely homogeneous, three-dimensional crystal structure that is ideally free of phases of pure cerium oxide, zirconium oxide or rare earth oxide (fixed solution). Depending on the manufacturing process, however, not completely homogeneous products may arise which can generally be used without any disadvantage. The same applies to cerium/zirconium mixed oxides which do not contain any rare earth metal oxide. In all other respects, the term "rare earth metal" or "rare earth metal oxide" within the meaning of the present invention does not include cerium or cerium oxide.

Lanthanum oxide, yttrium oxide, praseodymium oxide, neodymium oxide and/or samarium oxide can, for example, be considered as rare earth metal oxides in the cerium-zirconium-rare earth metal mixed oxides. Lanthanum oxide, yttrium oxide and/or praseodymium oxide are preferred. Lanthanum oxide and/or yttrium oxide are particularly preferred, and lanthanum oxide and yttrium oxide, yttrium oxide and praseodymium oxide, and lanthanum oxide and praseodymium oxide are more particularly preferred. In embodiments of the present invention, the oxygen storage components are free of neodymium oxide.

The proportion of rare earth metal oxide in the cerium/zirconium/rare earth metal mixed oxides is in particular 3 to 20% by weight based on the cerium/zirconium/rare earth metal mixed oxide.

If the cerium/zirconium/rare earth metal mixed oxides contain yttrium oxide as a rare earth metal, the proportion thereof is preferably 4 to 15% by weight based on the cerium/zirconium/rare earth metal mixed oxide. If the cerium/zirconium/rare earth metal mixed oxides contain praseodymium oxide as a rare earth metal, the proportion thereof is preferably 2 to 10% by weight based on the cerium/zirconium/rare earth metal mixed oxide. If the cerium/zirconium/rare earth metal mixed oxides contain lanthanum oxide and a further rare earth oxide as a rare earth metal, such as yttrium oxide or praseodymium oxide, the mass ratio thereof is in particular 0.1 to 1.25, preferably 0.1 to 1.

The coating Z usually contains oxygen storage components in quantities of 15 to 120 g/l, based on the volume of the wall-flow filter substrate. The mass ratio of carrier materials and oxygen storage components in the coating Z is usually 0.25 to 1.5, for example 0.3 to 1.3.

For example, the weight ratio of the sum of the masses of all aluminum oxides (including doped aluminum oxides) to the sum of the masses of all cerium/zirconium mixed oxides in coating Z is 10:90 to 75:25.

In embodiments of the present invention, the coating Z comprises lanthanum-stabilized aluminum oxide, rhodium, palladium or palladium and rhodium, and a cerium/zirconium/rare earth metal mixed oxide containing yttrium oxide and lanthanum oxide as rare earth metal oxides.

In other embodiments of the present invention, the coating Z comprises lanthanum-stabilized aluminum oxide, rhodium, palladium or palladium and rhodium, and a cerium/zirconium/rare earth metal mixed oxide containing praseodymium oxide and lanthanum oxide as rare earth metal oxides.

In other embodiments of the present invention, the coating Z comprises lanthanum-stabilized aluminum oxide, rhodium, palladium, or palladium and rhodium, a cerium/zirconium/rare earth metal mixed oxide containing praseodymium oxide and lanthanum oxide as rare earth metal oxides, and a second cerium/zirconium/rare earth metal mixed oxide containing yttrium oxide and lanthanum oxide as rare earth metal oxides.

Coating Z preferably does not contain a zeolite or a molecular sieve.

If coating Z contains aluminum oxide or doped aluminum oxide, the weight ratio of the sum of the masses of all aluminum oxides or doped aluminum oxides to the sum of the masses of all cerium/zirconium mixed oxides or cerium/zirconium/rare earth metal mixed oxides is in particular 10:90 to 75:25.

According to the invention, coating F comprises a particulate metal compound and no noble metal. It is therefore not catalytically active within the meaning of the present invention, i.e., it is not capable of oxidizing the exhaust gas components CO and HC and reducing $NO_x$.

Preferably, coating F consists of one or more particulate metal compounds, i.e., it contains no other constituents.

Suitable metal compounds are well known to the person skilled in the art since they are generally high-melting metal compounds that are commonly used as carrier materials for catalysts in the automotive exhaust sector. Preference is given to metal oxides, metal sulfates, metal phosphates, metal carbonates or metal hydroxides or mixtures thereof. Metal oxides are particularly preferred.

Metal oxides that can be considered are primary, binary or ternary metal oxides or mixtures thereof.

The metals to be considered are in particular selected from the group consisting of alkali metals, alkaline earth metals, earth metals and transition metals. Preferably, the metals are selected from the group consisting of calcium, potassium, magnesium, strontium, barium, iron, zinc, aluminum, silicon, titanium, zirconium, lanthanum, praseodymium, bismuth, cobalt, nickel, copper, and cerium.

Very particularly preferred metal compounds are cerium oxide, titanium dioxide, zirconium dioxide, silicon dioxide, aluminum oxide or mixtures or mixed oxides thereof.

In addition, so-called pyrogenic metal oxides can also be used. In general, pyrogenically produced metal oxides are understood to be those obtained by flame hydrolysis or flame oxidation from a metal oxide precursor in an oxyhydrogen gas flame (https://de.wikipedia.org/w/index.php?title=Pyrogenes Siliciumdioxid&oldid=182147815; Pater Albers et al. Chemie in unserer Zeit [Chemistry in our Time], 2016, 50, 162-171; Hans Ferkel et al. MTZ—Motortechnische Zeitschrift [Engine Technology Magazine], 2010, 71, 128-133). These have properties as described for flame-synthesized particulate products in the following references, Gutsch et al. (2002) KONA (no. 20); Li S. et al. (2016) Progress in Energy and Combustion Science (55); Ulrich G. (1971) Combustion Science and Technology (vol. 4). Pyrogenic metal oxides are generally characterized by a high specific surface area and a low bulk density. Generally, large-surface oxides of different metals can be produced by means of this method. Such oxides are advantageously produced from the group of metals consisting of silicon, aluminum, titanium, zirconium, cerium or mixtures of such metals.

The wall-flow filter according to the invention can have an increasing concentration gradient of the coating F in the longitudinal direction of the filter from its first to the second end. According to the invention, the term "increasing gradient" refers to the fact that the gradient of the concentration of the coating F in the filter increases in the axial direction from one end to the other, possibly from negative values to more positive values.

In the case of an intended use of the wall-flow filter in which the exhaust gas flows in at its first end and out at the second end, a larger amount of coating F is preferably located near the second end of the wall-flow filter substrate and a significantly smaller amount of coating F is located near the first end of the wall-flow filter substrate.

Simulations of the gas flow in a wall-flow filter have shown that the last third of the substrate is mainly (more than 50%) responsible for the filtration property of the overall filter. An increased application of a coating F on the last third of the filter additionally increases the back pressure there, this being due to the lower permeability, and the throughflow shifts more into the first two thirds of the filter. The filter should therefore have a more rapidly increasing gradient of the coating F from the first to the second end in order to increase its filtration effect.

This applies mutatis mutandis to the adjustment of an advantageous exhaust-gas back pressure. In a further embodiment according to the invention, the gradient of the concentration of coating F therefore increases less sharply or the gradient of the concentration of coating F decreases from the first to the second end.

The coating F is preferably located in the porous walls of the wall-flow filter substrate, from which it follows that the particle size of the metal compound must be adapted to the pore size of the wall-flow filter substrate. The particles of the metal compound thus have in particular a defined particle size distribution.

Since wall-flow filter substrates usually contain pores of different sizes, a proportion of larger particles is ideally present for the large pores and a proportion of smaller particles for the smaller pores. This means that the metal compound preferably has a multimodal or broad q3 particle size distribution.

For the definition of the particle size or grain size distribution of the metal compound, a distinction is made, depending on the method by which the quantity of particles is determined, among other things between number-related (q0) and volume-related (q3) grain size distributions (M. Stieß, Mechanische Verfahrenstechnik—Partikeltechnologie 1 (Mechanical Process Technology—Particle Technology 1), Springer, 3rd edition 2009, page 29). Here, the size of the coarse particles (defined by the d90 value of the q3 grain size distribution, measured with the Tornado dry dispersion module of the company Beckmann according to the most recent ISO 13320-1 on the date of application) of the metal compound should be less than or equal to 60% of the average volume-related q3 pore size (d50) of the filter used (measured according to DIN 66134, latest version on the date of application), preferably less than 50%. The average q3 grain size of the metal compound (d50) should be 5% to 30% of the average q3 pore size (d50) of the filter used, preferably 7% to 25%, and very preferably 10% to 25%. The d10 value of the q3 grain size distribution of the metal compound, which describes the fine fraction, should be 20% to 60% of the average q3 grain size (d50) of the metal compound, preferably 25% to 50%, and particularly preferably 25% to 40%. The d10 value of the number-related q0 grain size distribution should generally be higher than 0.05 μm, preferably higher than 0.08 μm, and particularly preferably higher than 0.1 μm.

The particles of the metal compound have in particular a total surface area of greater than 5 $m^2$/l, preferably greater than 10 $m^2$/l and very particularly preferably greater than 15 $m^2$/l, based on the outer filter volume in liters. The total surface area of the particles SV is obtained from the particle size x according to:

$$S_V[m^{-1}] = 6 \cdot \int_{xmin}^{xmax} x_i^{-1} \cdot q_0(x_i) \cdot dx = 6 \cdot \sum_{min}^{max} \frac{\Delta Q_3(x_i)}{x_i}$$

(M. Stieß, Mechanische Verfahrenstechnik—Partikeltechnologie 1 [Mechanical Process Engineering—Particle Technology 1], Springer, 3rd edition, 2009, page 35), and the mass-related surface (M. Stieß, Mechanische Verfahrenstechnik—Partikeltechnologie 1, Springer, 3rd edition, 2009, page 16) is obtained therefrom with the density of the particles p:

$$S_{m\left[\frac{m^2}{kg}\right]} = \frac{S_V}{\rho_{particles}}$$

outer surface of the powder $S_{outer}[m^2] = S_m \cdot m_{powder}$

The person skilled in the art can easily determine the particle size distribution and the total surface area of the metal compound of a finished wall-flow filter according to the invention by washing the metal compound out of the wall-flow filter substrate with water. He/she only has to collect the washed-out material, dry it and then determine the desired parameters using the methods known to him/her or mentioned above.

In particular, a portion of the coating F can also be formed on the surface $O_E$ as a result of the production process. In particular, 1 to 90% of the total mass of the coating F can be located on the surface $O_E$, but preferably 2 to 70% and particularly preferably 3 to 50%.

The coating F preferably does not form a coherent, continuous layer on the surface $O_E$, but selectively clogs the large pores of the wall-flow substrate, resulting in an island-like deposition pattern.

The coating F can be wholly or partially present as a closed layer on the surfaces $O_E$. In this case, the layer thickness of the coating F is generally 1 to 75 μm, but preferably 5 to 65 μm.

In an embodiment according to the invention in which the coating Z is located on the surfaces $O_A$, the layer thickness of the coating F is less than or equal to the layer thickness of the coating Z. The ratio of the layer thickness of the coating F to the layer thickness of the coating Z is preferably 0.1 to 1, more preferably 0.15 to 0.95 and particularly preferably 0.2 to 0.9. Furthermore, the average particle diameter $d_{50}$ of the oxides of coating F is smaller than or equal to the average particle diameter $d_{50}$ of the coating Z. Preferably, the ratio of the $d_{50}$ of the particles of coating F to the $d_{50}$ of the particles of coating Z is 0.01 to 1, preferably 0.05 to 0.9 and particularly preferably 0.15 to 0.8.

In an embodiment according to the invention in which the coating Z is located in the pores of the filter wall, the layer thickness of the coating F is greater than or equal to the layer thickness of the coating Z. Furthermore, the average particle diameter $d_{50}$ of the oxides of coating F is greater than or equal to the average particle diameter $d_{50}$ of the coating Z. Preferably, the ratio of the $d_{50}$ of the particles of coating F to the $d_{50}$ of the particles of coating Z is 1 to 7, preferably 1.05 to 6 and particularly preferably 1.1 to 5.

In an embodiment according to the invention in which the coating Y is located on the surfaces $O_E$, the layer thickness of the coating F is less than or equal to the layer thickness of the coating Y The ratio of the layer thickness of the coating F to the layer thickness of the coating Y is preferably 0.1 to 1, more preferably 0.15 to 0.95 and particularly preferably 0.2 to 0.9. Furthermore, the average particle diameter $d_{50}$ of the oxides of coating F is smaller than or equal to the average particle diameter $d_{50}$ of the coating Y Preferably, the ratio of the $d_{50}$ of the particles of coating F to the $d_{50}$ of the particles of coating Y is 0.01 to 1, preferably 0.05 to 0.9 and particularly preferably 0.15 to 0.8.

In an embodiment according to the invention in which the coating Y is located in the pores of the filter wall, the layer thickness of the coating F is greater than or equal to the layer thickness of the coating Y Furthermore, the average particle diameter $d_{50}$ of the oxides of coating F is greater than or equal to the average particle diameter $d_{50}$ of the coating Y Preferably, the ratio of the $d_{50}$ of the particles of coating F to the $d_{50}$ of the particles of coating Y is 1 to 7, preferably 1.05 to 6 and particularly preferably 1.1 to 5.

Based on the volume of the wall-flow filter substrate, coating F is present, for example, in amounts of less than 50 g/l, in particular of less than 40 g/l. The coating F is preferably present in amounts from 2.5 to 40 g/l based on the volume of the wall-flow filter substrate.

The coating F may extend over the entire length L of the wall-flow filter substrate or only over a portion thereof. For example, coating F extends over 10 to 100, 25 to 80 or 40 to 60% of the length L.

In an embodiment of the wall-flow filter according to the invention, the wall-flow filter substrate has a coating Y, which is different from the coatings Z and F, which comprises platinum, palladium or platinum and palladium, which contains no rhodium and no cerium/zirconium mixed oxide and which is located in the porous walls and/or on the surfaces $O_E$, but not on the surfaces $O_A$. Preferably, coating Y contains platinum and palladium with a mass ratio of platinum to palladium of 25:1 to 1:25, particularly preferably 15:1 to 1:2.

In the coating Y, platinum, palladium or platinum and palladium are usually fixed on one or more carrier materials.

All materials that are familiar to the person skilled in the art for this purpose are considered as support materials. Such materials are in particular metal oxides with a BET surface area of 30 to 250 $m^2/g$, preferably 100 to 200 $m^2/g$ (determined according to DIN 66132, latest version as of filing date). Particularly suitable carrier materials are selected from the series consisting of aluminum oxide, doped aluminum oxide, silicon oxide, titanium dioxide and mixed oxides of one or more thereof. Doped aluminum oxides are, for example, aluminum oxides doped with lanthanum oxide, zirconium oxide, barium oxide and/or titanium oxide. Aluminum oxide or lanthanum-stabilized aluminum oxide is advantageously used, wherein in the latter case lanthanum is used in quantities of 1 to 10% by weight, preferably 3 to 6% by weight, in each case calculated as $La_2O_3$ and based on the weight of the stabilized aluminum oxide.

Also in the case of aluminum oxide doped with barium oxide, the proportion of barium oxide is in particular 1 to 10% by weight, preferably 3 to 6% by weight, in each case calculated as BaO and based on the weight of the stabilized aluminum oxide.

Another suitable carrier material is lanthanum-stabilized aluminum oxide the surface of which is coated with lanthanum oxide, with barium oxide and/or with strontium oxide.

Coating Y preferably comprises at least one aluminum oxide or doped aluminum oxide.

In one embodiment, the coating Y is located exclusively on the surfaces $O_E$ of the wall-flow filter substrate and extends from its first end over a length of 50 to 90% of the length L.

In another embodiment, the coating Y is located in the porous walls of the wall-flow filter substrate and extends, from its first end, preferably over a length of 50 to 100% of the length L.

If coating Y is present, the mass ratio of coating Y to coating Z is preferably 0.05 to 8.5.

For example, the carrier material of coating Y has a larger pore volume than the carrier material of coating Z. The ratio of the specific surfaces of the carrier oxides of coating Y to coating Z is preferably 0.5 to 2, in particular 0.7 to 1.5.

For example, the ratio of the pore volume of the particulate metal compound of coating F to the pore volume of the carrier material of coating Z is preferably from 0.01 to 3, in particular from 0.05 to 2.5. The ratio of the specific surfaces of the particulate metal compound of coating F to the specific surface area of the carrier oxides of coating Z is preferably 0.1 to 4, in particular 0.25 to 3.

The coatings Z, F and, if present, Y can be arranged on the wall-flow filter substrate in various ways. FIGS. 1 to 10 explain this by way of example, wherein FIGS. 1 to 4 relate to wall-flow filters according to the invention which comprise only the coatings Z and F, while the wall-flow filters according to the invention as shown in FIGS. 5 to 10 additionally comprise the coating Y.

FIG. 1 relates to a wall-flow filter according to the invention in which the coating Z is located in the channels A on the surfaces $O_A$ and extends from the second end of the wall-flow filter substrate over 50% of the length L. The coating F is located in the channels E and extends over the entire length L.

Figure 2:
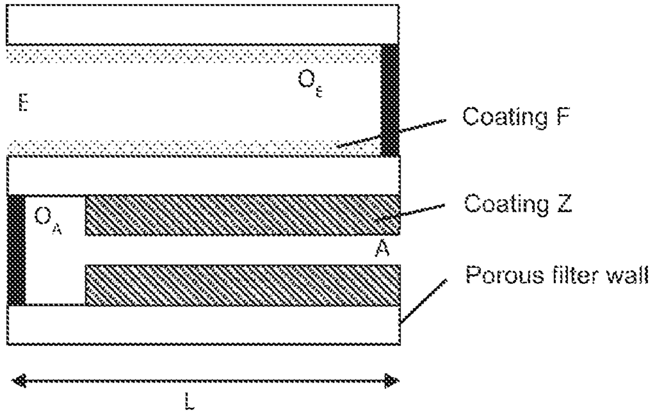

FIG. 2 also relates to a wall-flow filter according to the invention in which the coating Z is located in the channels A on the surfaces $O_A$. Starting from the second end of the wall-flow filter substrate, however, it extends over 80% of the length L. The coating F is located in the channels E and extends over the entire length L.

Figure 3:
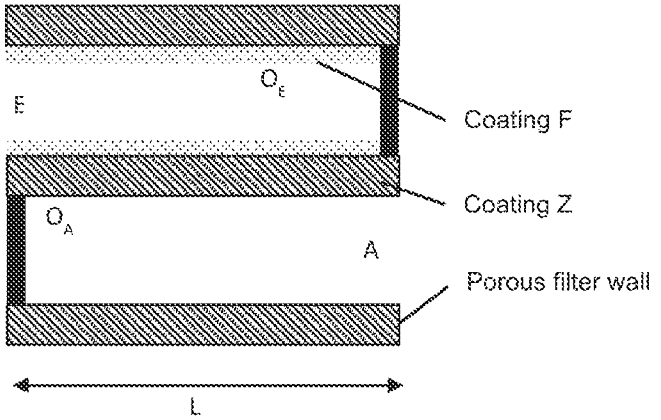

FIG. 3 relates to a wall-flow filter according to the invention in which the coating Z is located in the porous walls and extends over the entire length L. The coating F is located in the channels E and likewise extends over the entire length L.

Figure 4:
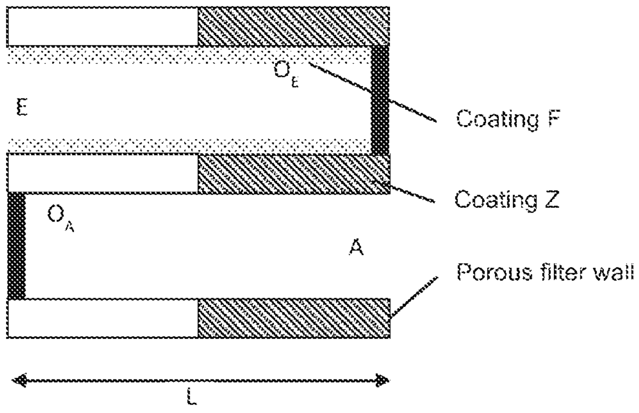

FIG. 4 relates to a wall-flow filter according to the invention in which the coating Z is located in the porous walls and extends from the second end of the wall-flow filter substrate over 50% of the length L. The coating F is located in the channels E and extends over the entire length L.

Figure 5:
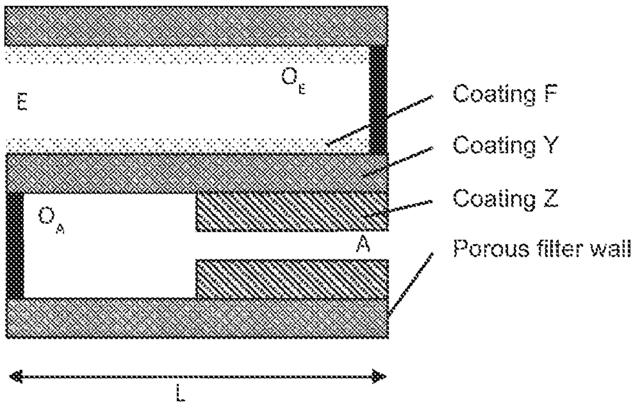

FIG. 5 relates to a wall-flow filter according to the invention which differs from that of FIG. 4 in that coating Z is located over 50% of the length L on the surfaces $O_A$ and additionally coating Y is located in the porous walls over the entire length L. The coating F is located in the channels E and extends over the entire length L.

Figure 6:
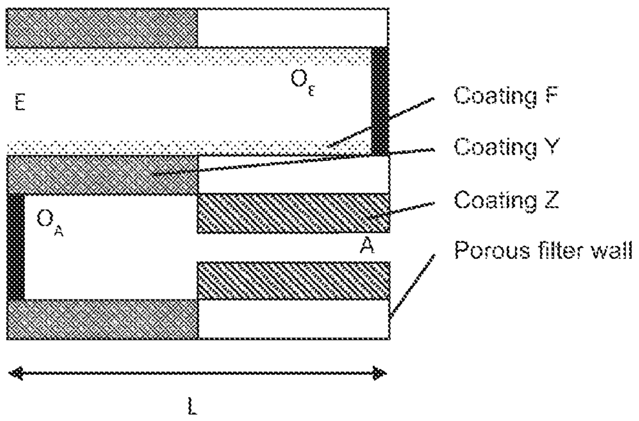

FIG. 6 relates to a wall-flow filter according to the invention which differs from that of FIG. 4 in that coating Z extends over 50% of the length L on the surfaces $O_A$ and additionally coating Y extends in the porous walls, starting from the first end of the wall-flow filter substrate, over 50% of the length L. The coating F is located in the channels E and extends over the entire length L.

Figure 7:
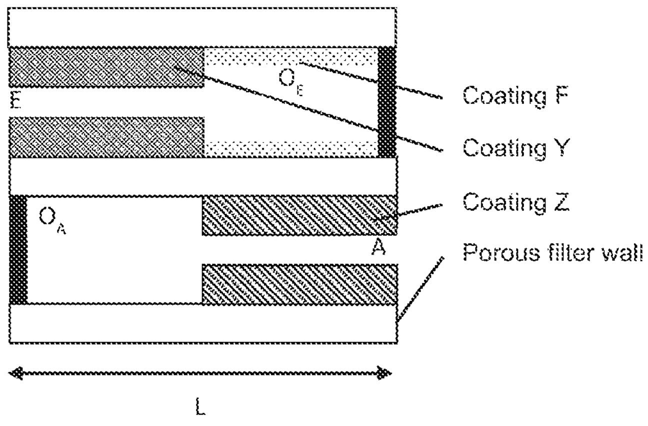

FIG. 7 relates to a wall-flow filter according to the invention in which the coating Z is located in the channels A on the surfaces $O_A$ and extends over 50% of the length L. In addition, coating Y is located in the channels E on the surfaces $O_E$ and extends from the first end of the wall-flow filter substrate over 50% of the length L. The coating F is located the channels E and extends from the second end of the wall-flow filter substrate over 50% of the length L.

Figure 8:
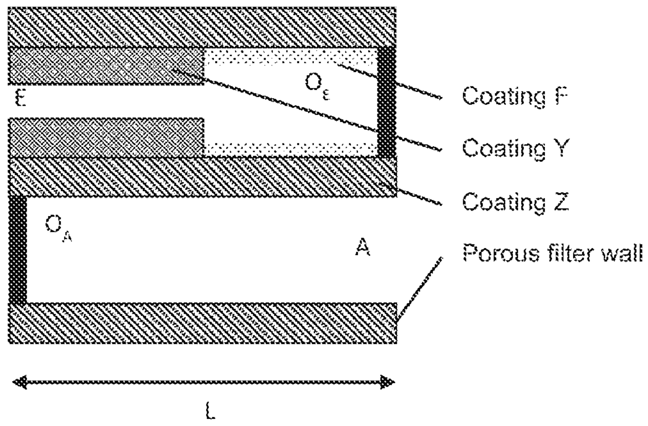

FIG. 8 relates to a wall-flow filter according to the invention in which the coating Z is located in the porous walls and extends over the entire length L. In addition, coating Y is located in the channels E on the surfaces $O_E$ and extends from the first end of the wall-flow filter substrate over 50% of the length L. The coating F is located the channels E and extends from the second end of the wall-flow filter substrate over 50% of the length L.

Figure 9:
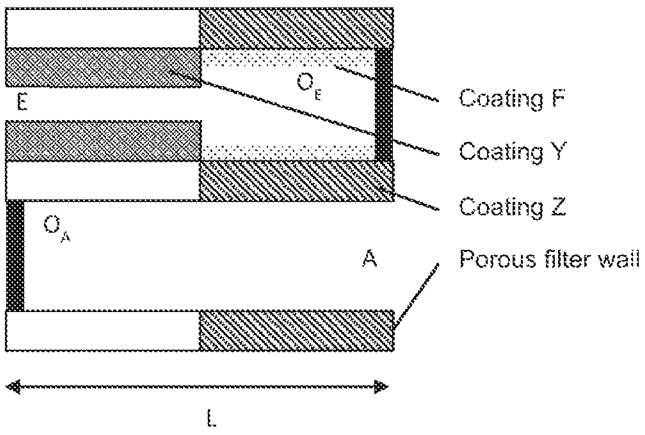

FIG. 9 relates to a wall-flow filter according to the invention in which the coating Z is located in the porous walls and extends from the second end of the wall-flow filter substrate over 50% of the length L. In addition, coating Y is located in the channels E on the surfaces $O_E$ and extends from the first end of the wall-flow filter substrate over 50% of the length L. The coating F is located the channels E and extends from the second end of the wall-flow filter substrate over 50% of the length L.

Figure 10:
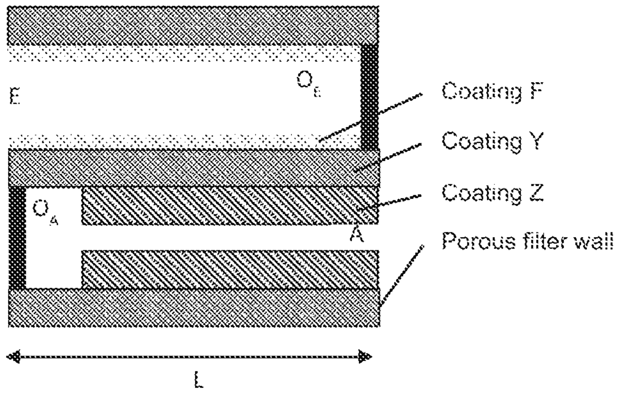

FIG. 10 relates to a wall-flow filter according to the invention in which the coating Z is located in the channels A on the surfaces $O_A$ and extends from the second end of the wall-flow filter substrate over 80% of the length L. In addition, coating Y is located in the porous walls and extends over the entire length L. The coating F is located the channels E and extends over the entire length L.

The wall-flow filter according to the invention can be produced by applying the coatings Z, F and, if present, Y to a wall-flow filter substrate. In this case, the catalytic activity is provided as specified by the person skilled in the art by coating the wall-flow filter substrate with the coating Z and, if present, with the coating Y.

The term "coating" is accordingly to be understood to mean the application of catalytically active materials to a wall-flow filter substrate. The coating assumes the actual catalytic function. In the present case, the coating is carried out by applying a correspondingly low-viscosity aqueous suspension of the catalytically active components, also referred to as a washcoat, into or onto the wall of the wall-flow filter substrate, for example in accordance with EP1789190B1. After application of the suspension, the wall-flowfilter substrate is dried in each case and, if applicable, calcined at an increased temperature. The catalytically coated filter preferably has a loading of 20 g/l to 200 g/l, preferably 30 g/l to 150 g/l (coating Z or sum of the coatings Z and Y). The most suitable amount of loading of a filter coated in the wall depends on its cell density, its wall thickness, and the porosity.

The coating F is applied to the wall-flow filter substrate in particular by impinging a dry powder/gas aerosol on the channels E of the dry wall-flow filter substrate already coated with coating Z and optionally coating Y, wherein the powder contains a particulate metal compound and in particular consists of a particulate metal compound.

By impinging a dry powder/gas aerosol on a wall-flow filter substrate which has been wet-coated in the conventional manner with coating Z and optionally Y, dried and optionally calcined, a wall-flow filter according to the invention is obtained which has extremely good filtration efficiency and only slightly increased exhaust gas back pressure and, at the same time, excellent catalytic efficiency.

The wall-flow filters which are catalytically coated according to the invention and then impinged on by powder, differ from those that are produced in the exhaust system of a vehicle by ash deposition during operation. According to the invention, the catalytically active wall-flow filter substrates are selectively powder-sprayed with a specific, dry powder. As a result, the balance between filtration efficiency and exhaust-gas back pressure can be adjusted selectively right from the start. Wall-flow filters in which undefined ash deposits have resulted from combustion of fuel, e.g., in the cylinder during driving operation or by means of a burner, are therefore not included in the present invention.

When the dry powder/gas aerosol is impinged on the wall-flow filter substrates considered here, the powder particles are deposited in the pores of the wall-flow filter substrate and, optionally, on the surfaces $O_E$ following the flow of the gas. In the process, the different wall permeability of the wall-flow filter substrate (e.g., due to inhomogeneities of the filter wall itself or different coating zones) leads to selective deposition of the powder in the pores of the wall or on the surfaces $O_E$ where the flow is the greatest. This effect also results in, for example, cracks or pores in the washcoat layer being filled up by the porous powder due to coating defects, such that the soot particles in the exhaust gas are later increasingly retained as the exhaust gas passes through the filter. A better filtration efficiency is consequently the result.

According to the invention, the dry wall-flow filter substrate coated with coating Z and optionally coating Y is covered with a powder starting from its first and in the direction of its second end (i.e. with respect to the intended use in the direction of exhaust gas flow) in such a way that the cell wall regions through which the flow is strongest are covered with loose, inherently porous powder accumulations in the porous walls and/or also on the surfaces $O_E$ in order to obtain a desired increased filtration efficiency. In the process, the formation of the intrinsically porous powder accumulations surprisingly leads to a relatively low increase in back pressure. In a preferred embodiment, the wall-flow filter substrate is impinged with a powder/gas aerosol in such a way that during impingement, the powder is deposited in the pores of the porous wall and on the surfaces $O_E$ and builds up a cohesive layer here. In a further most preferred embodiment, the wall-flow filter is impinged with a powder/gas aerosol such that during impingement, the powder precipitates in the pores of the filter walls and fills them as far as the surfaces $O_E$ and thereby does not form a cohesive layer on surfaces $O_E$.

In order for the powder of the powder/gas aerosol to deposit sufficiently well in the pores of the wall-flow filter substrate coated with coating Z and, optionally, coating Y, or to adhere to the surfaces $O_E$, the particle diameter in the aerosol should be at least smaller than the pores of the wall-flow filter substrate. This can be expressed by the ratio of the average particle diameter ($Q_3$ distribution, measured according to the most recent ISO 13320 on the date of application) $d_{50}$ in the dry aerosol and the average pore diameter of the wall-flow filter after coating (measured according to DIN 66134, latest version on the date of application) being 0.03 to 2, preferably 0.05 to 1.43 and very particularly preferably 0.05 to 0.63. As a result, the particles of the powder in the aerosol, following the gas flow, can precipitate in the pores of the walls of the wall-flow filter substrate.

A suitable powder has in particular a specific surface area of at least 100 $m^2$/g and a total pore volume of at least 0.3 ml/g.

For a powder suitable for producing the wall-flow filters according to the invention, an optimization between the largest possible surface area of the powder used, the cross-linking, and the adhesive strength is advantageous. During operation in the vehicle, small particles follow the flow lines approximately without inertia due to their low particle relaxation time. A random "trembling movement" is superimposed on this uniform, convection-driven movement. Following this theory, the largest possible flowed-around surfaces should be provided for a good filtration effect of a wall-flow filter impinged on by powder. The powder should therefore have a high proportion of fines since with the same total volume of metal compound, small particles offer significantly larger surfaces. At the same time, however, the pressure loss must only increase insignificantly. This requires a loose crosslinking of the powder. For a filtration efficiency-enhancing coating, it is preferable to use powders having a tapped density of between 50 g/l and 900 g/l, preferably between 200 g/l and 850 g/l and most preferably between 400 g/l and 800 g/l.

The aerosol consisting of the gas and the powder may be produced in accordance with the requirements of the person skilled in the art or as illustrated below. For this purpose, a powder is usually mixed with a gas (http://www.tsi.com/Aerosolqeneratoren-und-disperqierer/: https://www.palas.de/de/product/aerosolqeneratorssolidparticles). This mixture of gas and powder produced in this way is then advantageously fed into the channels E of the wall-flow filter substrate via a gas stream.

All gases considered by the person skilled in the art for the present purpose can be used as gases for producing the aerosol and for introduction into the wall-flow filter substrate. The use of air is very particularly preferred. However, it is also possible to use other reaction gases which can develop either an oxidizing (e.g., $O_2$, $NO_2$) or a reducing (e.g., $H_2$) activity with respect to the powder used. With certain powders, the use of inert gases (e.g., $N_2$) or noble gases (e.g., He) may also prove advantageous. Mixtures of the listed gases are also conceivable.

In order to be able to deposit the powder to a sufficient depth into the channels E and with good adhesion, a certain suction power is needed. In orientation experiments for the respective wall-flow filter and the respective powder, the person skilled in the art can form their own idea in this respect. It has been found that the aerosol (powder/gas mixture) is preferably sucked through the wall-flow filter at a velocity of 5 m/s to 60 m/s, more preferably 10 m/s to 50 m/s, and very particularly preferably 15 m/s to 40 m/s. This likewise achieves an advantageous adhesion of the applied powder.

Dispersion of the powder in the gas for establishing a powder/gas aerosol takes place in various ways. Preferably, the dispersion of the powder is generated by at least one or a combination of the following measures: compressed air, ultrasound, sieving, "in situ milling," blowers, expansion of gases, fluidized bed. Further dispersion methods not mentioned here can likewise be used by the person skilled in the art. In principle, the person skilled in the art is free to select a method for producing the powder/gas aerosol. As already described, the powder is first converted by dispersion into a powder/gas aerosol and then guided into a gas stream.

This mixture of the gas and the powder thus produced is only subsequently introduced into an existing gas stream, which carries the finely distributed powder into the channels E of the wall-flow filter substrate. This process is preferably assisted by a suction device which is positioned in the pipeline on the outflow side of the filter. This is in contrast to the device shown in FIG. 3 of U.S. Pat. No. 8,277,880B, in which the powder/gas aerosol is produced directly in the gas stream. The method according to the invention allows a much more uniform and good mixing of the gas stream with the powder/gas aerosol, which ultimately ensures an advantageous distribution of the powder particles in the filter in the radial and axial direction and thus helps to make uniform and control the deposition of the powder particles on the filter.

The powder is dry when the wall-flow filter substrate is impinged on within the meaning of the invention. The powder is preferably mixed with ambient air and applied to the filter. By mixing the powder/gas aerosol with particle-free gas, preferably dry ambient air, the concentration of the particles is reduced to such an extent that no appreciable agglomeration takes place until deposition in the wall-flow filter substrate. This preserves the particle size in the aerosol adjusted during the dispersion.

Figure 12:
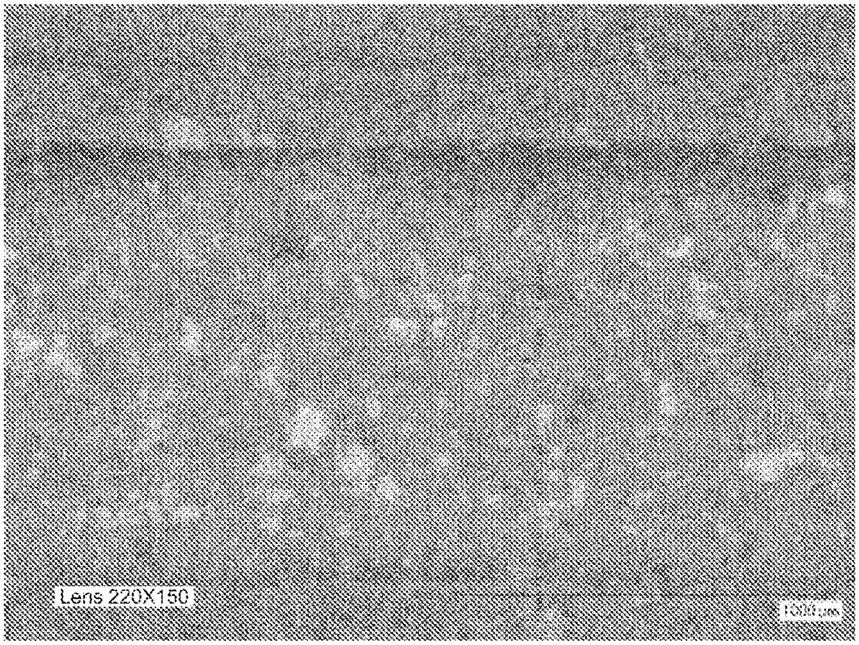

A preferred device for producing a wall-flow filter according to the invention is schematically illustrated in FIG. 12. Such a device is characterized in that

- at least one unit for dispersing powder in a gas;
- a unit for mixing the dispersion with an existing gas stream;
- at least two filter-receiving units designed to allow the gas stream to flow through the filter without further supply of a gas;
- a suction-generating unit that maintains the gas stream through the filter;
- optionally, a unit for generating vortices upstream of the filter so that deposition of powder on the inlet plugs of the filter is prevented as much as possible;
- and optionally, a unit by which at least one partial gas stream is extracted from the outflow side of the suction device and, before the powder addition, is added to the gas stream which is sucked through the filter;

are present.

Figure 11:
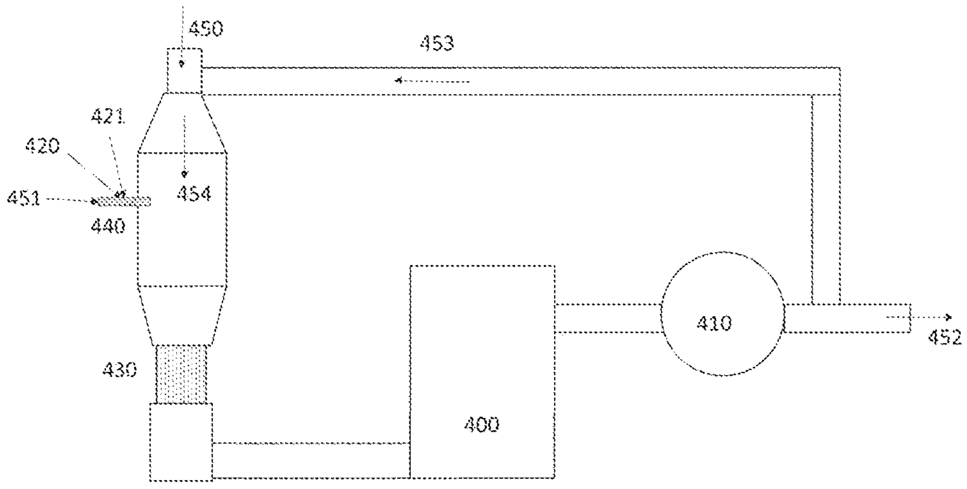

In this preferred embodiment of the method according to the invention, as shown in the drawing of FIG. 11, at least a partial gas stream is extracted from the outflow side of the suction device and added, before the powder addition, back to the gas stream that is sucked through the filter. The powder is thereby metered into an already heated air stream. The suction blowers for the necessary pressures generate approximately 70° C. exhaust air temperature since the installed suction power is preferably >20 kW. In an energetically optimized manner, the waste heat of the suction blower is used to heat the supply air in order to reduce the relative humidity of the supply air. This in turn reduces the adhesion of the particles to one another and to the input plugs. The deposition process of the powder can thus be better controlled.

In the present method for producing a wall-flow filter according to the invention, a gas stream is impinged on by a powder/gas aerosol and sucked into a wall-flow filter substrate. This ensures that the powder can be distributed sufficiently well in the gas stream for it to be able to penetrate into the channels E. Homogeneous distribution of the powder in the gas/air requires intensive mixing. For this purpose, diffusers, venturi mixers, and static mixers are known to the person skilled in the art. Particularly suitable for the powder coating process are mixing devices that avoid powder deposits on the surfaces of the coating system. Diffusers and venturi tubes are thus preferably used for this process. The introduction of the dispersed powder into a fast-rotating rotating flow with a high turbulence has also proven effective.

In order to achieve an advantageous uniform distribution of the powder over the cross section of the wall-flow filter substrate, the gas transporting the powder should have a piston flow (if possible, the same velocity over the cross section) when impinging on the filter. This is preferably adjusted by an accelerated flow upstream of the filter. As is known to the person skilled in the art, a continuous reduction of the cross section without abrupt changes causes such an accelerated flow, described by the continuity equation. Furthermore, it is also known to the person skilled in the art that the flow profile is thus more closely approximated to a piston profile. For the targeted change of the flow, built-in components, such as sieves, rings, disks, etc., can be used below and/or above the filter.

In a further advantageous design of the present method, the apparatus for powder coating has one or more devices (turbulators, vortex generators) with which the gas stream carrying the powder/gas aerosol can be vortexed prior to impingement on the filter. As an example in this respect, corresponding sieves or grids can be used which are placed at a sufficient distance on the inflow side of the wall-flow filter substrate. The distance should not be too large or small so that sufficient vortexing of the gas stream directly upstream of the wall-flow filter substrate is achieved. The person skilled in the art can determine the distance in simple experiments. The advantage of this measure is explained by the fact that powder constituents do not deposit on the plugs of the channels A and all the powder can penetrate into the channels E. Accordingly, it is preferred according to the invention if the powder is vortexed before flowing into the filter in such a way that deposits of powder on the plugs of the wall-flow filter substrate are avoided as far as possible. A turbulator or turbulence generator or vortex generator in aerodynamics refers to equipment which causes an artificial disturbance of the flow. As is known to the person skilled in the art, vortices (in particular microvortices) form behind rods, gratings, and other flow-interfering built-in components at corresponding Re numbers. Known are the Karman vortex street (H. Benard, C. R. Acad. Sci. Paris. Ser. IV 147, 839 (1908); 147, 970 (1908); T. von Karman, Nachr. Ges. Wiss. Gottingen, Math. Phys. KI. 509 (1911); 547 (1912)) and the wake turbulence behind airplanes which can cover roofs. In the case according to the invention, this effect can be intensified very particularly advantageously by vibrating self-cleaning sieves (so-called ultrasonic screens) which advantageously move in the flow. Another method is the disturbance of the flow through sound fields, which excites the flow to turbulences as a result of the pressure amplitudes. These sound fields can even clean the surface of the filter without flow. The frequencies may range from ultrasound to infrasound. The latter measures are also used for pipe cleaning in large-scale technical plants.

The preferred embodiments for the wall-flow filter apply mutatis mutandis also to the method. Reference is explicitly made in this respect to what was said above about the wall-flow filter.

Dry in the sense of the present invention means exclusion of the application of a liquid, in particular water. In particular, the production of a suspension of the powder in a liquid for spraying into a gas stream should be avoided. A certain moisture content may possibly be tolerable both for the filter and for the powder, provided that achieving the objective, i.e., the most finely distributed deposition of the powder in the porous walls and/or the surfaces $O_E$ of the wall-flow filter substrate possible, is not negatively affected. As a rule, the powder is free-flowing and dispersible by energy input. The moisture content of the powder or of the wall-flow filter substrate at the time of being impinged on by the powder should be less than 20%, preferably less than 10%, and very particularly preferably less than 5% (measured at 20° C. and normal pressure, ISO 11465, latest version on the filing date).

The wall-flow filter according to the invention exhibits an excellent filtration efficiency with only a moderate increase in exhaust-gas back pressure as compared to a wall-flow filter in the fresh state that has not been impinged on by powder. The wall-flow filter according to the invention preferably exhibits an improvement in soot particle deposition (filtering effect) in the filter of at least 5%, preferably at least 10% and very particularly preferably at least 20% at a relative increase in the exhaust-gas back pressure of the fresh wall-flow filter of at most 40%, preferably at most 20% and very particularly preferably at most 10% as compared to a fresh filter coated with catalytically active material but not treated with powder. The slight increase in back pressure is probably due to the cross section of the channels on the inlet side not being significantly reduced by impinging, according to the invention, the filter with a powder. It is assumed that the powder in itself forms a porous structure, which has a positive effect on the back pressure. For this reason, a wall-flow filter according to the invention should also exhibit better exhaust-gas back pressure than those of the prior art, with which a powder was deposited on the walls of the inlet side of a filter or a traditional coating using wet techniques was chosen.

Coating Z gives the wall-flow filter according to the invention excellent three-way activity, while the optional coating Y is capable of reducing the soot ignition temperature and thus facilitates soot burn-off.

The present invention thus also relates to the use of a wall-flow filter according to the invention for reducing harmful exhaust gases of an internal combustion engine. The use of the wall-flow filter according to the invention for treating exhaust gases of a stoichiometrically operated internal combustion engine, i.e., in particular a gasoline-operated internal combustion engine, is preferred.

The wall-flow filter according to the invention is very advantageously used in combination with at least one three-way catalyst. In particular, it is advantageous if a three-way catalyst is located in a position close to the engine on the inflow side of the wall-flow filter according to the invention. It is also advantageous if a three-way catalyst is located on the outflow side of the wall-flow filter according to the invention. It is also advantageous if a three-way catalyst is located on the inflow side and on the outflow side of the wall-flow filter.

The preferred embodiments described for the wall-flow filter according to the invention also apply mutatis mutandis to the use mentioned here.

The present invention further relates to an exhaust gas purification system comprising a filter according to the invention and at least one further catalyst. In one embodiment of this system, at least one further catalyst is arranged upstream of the filter according to the invention. Preferably, this is a three-way catalyst or an oxidation catalyst or a $NO_x$ storage catalyst. In a further embodiment of this system, at least one further catalyst is arranged downstream of the filter according to the invention. Preferably, this is a three-way catalyst or an SCR catalyst or a $NO_x$ storage catalyst or an ammonia slip catalyst. In a further embodiment of this system, at least one further catalyst is arranged upstream of the filter according to the invention and at least one further catalyst is arranged downstream of the filter according to the invention.

Preferably, the upstream catalyst is a three-way catalyst or an oxidation catalyst or a $NO_x$ storage catalyst and the downstream catalyst is a three-way catalyst or an SCR catalyst or a $NO_x$ storage catalyst or an ammonia slip catalyst.

The preferred embodiments described for the wall-flow filter according to the invention also apply mutatis mutandis to the exhaust gas purification system mentioned here.

Typically, the filter according to the invention is used primarily in internal combustion engines, in particular in internal combustion engines with direct injection or intake manifold injection. These are preferably stoichiometrically operated gasoline or natural gas engines. Preferably, these are motors with turbocharging.

The requirements applicable to gasoline particulate filters (GPF) differ significantly from the requirements applicable to diesel particulate filters (DPF). Diesel engines without DPF can have up to ten times higher particle emissions, based on the particle mass, than gasoline engines without GPF (Maricq et al., SAE 1999-01-01530). In addition, there are significantly fewer primary particles in the case of gasoline engines, and the secondary particles (agglomerates) are significantly smaller than in diesel engines. Emissions from gasoline engines range from particle sizes of less than 200 nm (Hall et al., SAE 1999-01-3530) to 400 nm (Mathis et al., Atmospheric Environment 38 4347) with a maximum in the range of around 60 nm to 80 nm. For this reason, the nanoparticles in the case of GPF must mainly be filtered by diffusion separation. For particles smaller than 300 nm, separation by diffusion (Brownian molecular motion) and electrostatic forces becomes more and more important with decreasing size (Hinds, W.: Aerosol technology: Properties and behavior and measurement of airborne particles. Wiley, 2nd edition 1999).

FIGS. 1 to 10 show the different coating arrangements of wall-flow filters according to the invention, which are already described in more detail above. The following designations are used therein:

(E) the inlet channel/inflow channel of the wall-flow filter
(A) the outlet channel/outflow channel of the wall-flow filter
($O_E$) the surfaces formed by the inlet channels (E)
($O_A$) the surfaces formed by the outlet channels (A)
(L) the length of the filter wall
(Z) the coating Z
(Y) the coating Y
(F) the coating F FIG. 11 shows a schematic drawing of an advantageous device for impinging the filters with a powder. The powder 420 or 421 is mixed with the gas under pressure 451 through the atomizer nozzle 440 in the mixing chamber with the gas stream 454 and then is sucked or pushed through the filter 430. The particles that have penetrated are filtered out in the exhaust filter 400. The blower 410 provides the necessary volumetric flow. The exhaust gas is divided into an exhaust 452 and a warm cycle gas 453. The warm cycle gas 453 is mixed with the fresh gas 450.

FIG. 12 shows a light microscopic image of a wall-flow filter impinged on by powder. The photograph shows a top view of a plurality of channel walls in a region of the wall-flow filter where no catalytically active on-wall layer is located. The powder is selectively deposited in the pores of the wall and fills them.

Figure 13:
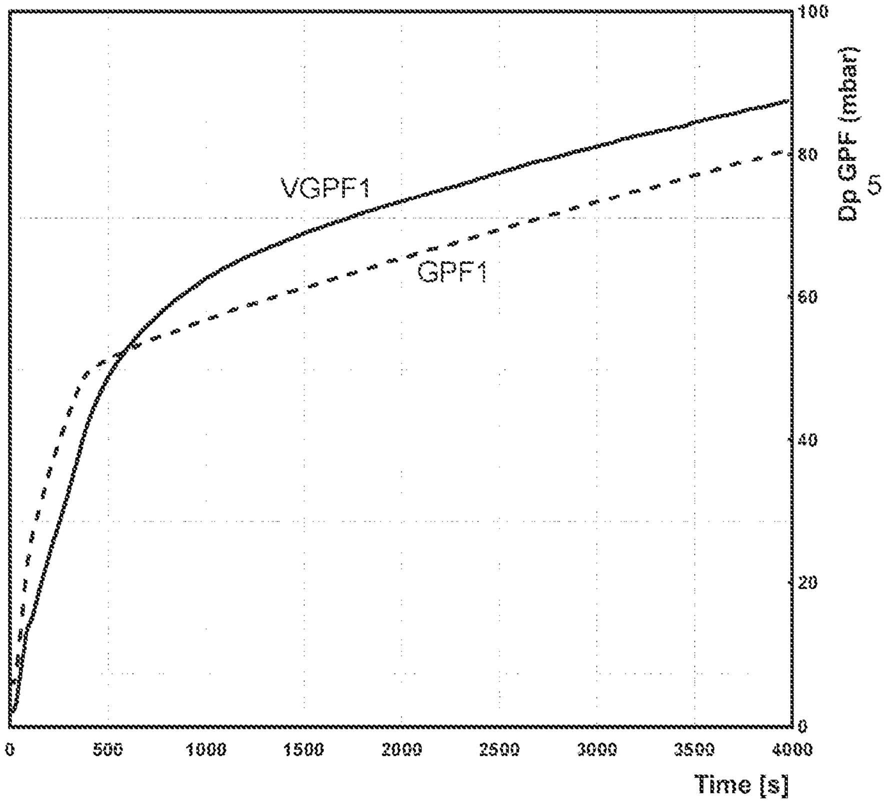

FIG. 13 shows a comparison of the back pressure of the catalysts GPF1 and VGPF1 after soot loading.

Figure 14:
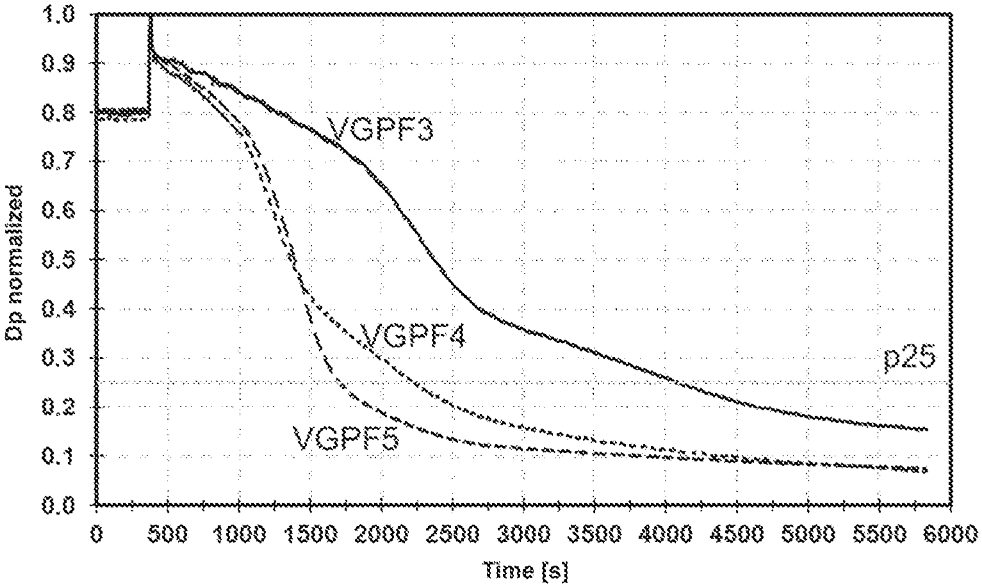

FIG. 14 relates to a soot burn-off test carried out with the catalysts VGPF3, VGPF4 and VGPF5 and shows the time required for the back pressure of the soot-loaded filter to drop to 25% of the original back pressure without soot (defined as p25).

The advantages of the invention are explained using examples below.

Comparative Example 1: Coating Z Only

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was subsequently mixed with a palladium nitrate solution and a rhodium nitrate solution under constant stirring. The resulting coating suspension was used directly for coating a commercially available wall-flow filter substrate, the coating being introduced over 80% of the substrate length on the surfaces $O_A$. The total load of this filter amounted to 75 g/l; the total noble metal load amounted to 1.27 g/l with a ratio of palladium to rhodium of 5:1. The coated filter thus obtained was dried and then calcined. It is hereinafter referred to as VGPF1.

Example 1 According to the Invention: Coating Z in Combination with Coating F Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was subsequently mixed with a palladium nitrate solution and a rhodium nitrate solution under constant stirring. The resulting coating suspension was used directly for coating a commercially available wall-flow filter substrate, the coating being introduced over 80% of the substrate length on the surfaces $O_A$. The total load of this filter amounted to 75 g/l; the total noble metal load amounted to 1.27 g/l with a ratio of palladium to rhodium of 5:1. The coated filter thus obtained was dried and then calcined. Subsequently, the filter was impinged on by a dry powder/gas aerosol, wherein 7 g/L of a metal oxide was introduced into channels E. It is hereinafter referred to as GPF1.

The two filters VGPF1 and GPF1 thus obtained were measured on a cold-blast test bench in order to determine the pressure loss over the respective filter. At room temperature and a volumetric flow rate of 900 $m^3$/h of air, the back pressure is 111 mbar for the VGPF1 and 122 mbar for the GPF1. As already described, the filtration coating F only leads to a moderate increase in back pressure.

Furthermore, the two filters were investigated with respect to the back pressure after soot loading. For this purpose, both filters were sooted on an engine test bench with a direct-injection turbocharged engine. The final soot loading was about 3 g. FIG. 13 shows that the GPF1 according to the invention, despite the higher back pressure in the clean state, has a lower back pressure after soot loading than the comparative filter VGPF1.

At the same time, fresh VGPF1 and GPF1 filters were investigated in the vehicle in terms of their particle filtration efficiency. For this purpose, the filters were measured in an RTS-95, also known as RTC-aggressive, driving cycle in a position close to the engine between two particle counters. In both cases, a three-way catalyst was located upstream in the exhaust tract, through which the lambda control of the vehicle was effected. Here the filter GPF1 according to the invention has a filtration efficiency of 84%, calculated from the particle values of the two particle counters, while the comparative filter VGPF1 achieves a filtration efficiency of only 55.5%. Overall, it can be seen that the combination of filtration coating F and the three-way coating Z is particularly advantageous in terms of back pressure after soot loading and filtration efficiency.

Comparative Example 2: Coating Z Only

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was subsequently mixed with a palladium nitrate solution and a rhodium nitrate solution under constant stirring. The resulting coating suspension was used directly for coating a commercially available wall-flow filter substrate, the coating being introduced into the porous filter wall over 100% of the substrate length. The total load of this filter amounted to 75 g/l; the total noble metal load amounted to 1.24 g/l with a ratio of palladium to rhodium of 6:1. The coated filter thus obtained was dried and then calcined. It is hereinafter referred to as VGPF2.

Example 2 According to the Invention: Coating Z in Combination with Coating F

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was subsequently mixed with a palladium nitrate solution and a rhodium nitrate solution under constant stirring. The resulting coating suspension was used directly for coating a commercially available wall-flow filter substrate, the coating being introduced into the porous filter wall over 100% of the substrate length. The total load of this filter amounted to 75 g/l; the total noble metal load amounted to 1.24 g/l with a ratio of palladium to rhodium of 6:1. The coated filter thus obtained was dried and then calcined. Subsequently, the filter was impinged on by a dry powder/gas aerosol, wherein 10 g/L of a metal oxide was introduced into the channels E. It is hereinafter referred to as GPF2.

The two filters VGPF2 and GPF2 were investigated in the vehicle in terms of their particle filtration efficiency. For this purpose, the filters were measured in a WLTP driving cycle in a position close to the engine between two particle counters. In both cases, a three-way catalyst was located upstream in the exhaust tract, through which the lambda control of the vehicle was effected. Here the filter GPF2 according to the invention has a filtration efficiency of 85%, calculated from the particle values of the two particle counters, while the comparative filter VGPF2 achieves a filtration efficiency of only 65%.

Furthermore, the filters VGPF2 and GPF2 were aged in an engine test bench aging process. This aging process consists of an overrun cut-off aging process with an exhaust gas temperature of 950° C. before the catalyst inlet (maximum bed temperature of 1030° C.). The aging time was 76 hours (see Motortechnische Zeitschrift, 1994, 55, 214-218). The catalytically active particulate filters were then tested in the aged state on an engine test bench in the so-called "light-off test" and in the "lambda sweep test" to compare their catalytic activity. In the light-off test, the light-off behavior is determined in the case of a stoichiometric exhaust gas composition with a constant average air ratio λ (λC=0.999 with ±3.4% amplitude).

Table 1 below contains the temperatures $T_{50}$ at which 50% of the considered components are respectively converted.

TABLE 1

| | $T_{50}$ HC stoichiometric | $T_{50}$ CO stoichiometric | $T_{50}$ NOx stoichiometric |
|---|---|---|---|
| VGPF2 | 366 | 373 | 372 |
| GPF2 | 366 | 373 | 373 |

The dynamic conversion behavior of the particulate filters was determined in a lambda sweep test in a range from λ=0.99-1.01 at a constant temperature of 510° C. The amplitude of λ in this case was ±6.8%. Table 2 shows the conversion at the intersection of the CO and $NO_x$ conversion curves, along with the associated HC conversion of the aged particulate filters.

TABLE 2

| | CO/NOx conversion at the point of intersection | HC conversion at λ of the CO/NOx point of intersection |
|---|---|---|
| VGPF2 | 93 | 92 |
| GPF2 | 92 | 93 |

From these tests it is evident that the filtration coating F is particularly suitable for significantly increasing the filtration efficiency of the filter GPF2 according to the invention without influencing the catalytic activity of the filter.

Comparative Example 3: Coating Z Only

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was subsequently mixed with a palladium nitrate solution and a rhodium nitrate solution under constant stirring. The resulting coating suspension was used directly for coating a commercially available wall-flow filter substrate, the coating being introduced over 60% of the substrate length on the surfaces $O_A$. The total load of this filter amounted to 75 g/l; the total noble metal load amounted to 0.88 g/l with a ratio of palladium to rhodium of 4:1. The coated filter thus obtained was dried and then calcined. It is hereinafter referred to as VGPF3.

Comparative Example 4: Coating Z Only

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was subsequently mixed with a palladium nitrate solution, a platinum nitrate solution and a rhodium nitrate solution with constant stirring. The resulting coating suspension was used directly for coating a commercially available wall-flow filter substrate, the coating being introduced over 60% of the substrate length on the surfaces $O_A$. The total load of this filter amounted to 75 g/l; the total noble metal load amounted to 0.88 g/l with a ratio of platinum to palladium to rhodium of 92:108:50. The coated filter thus obtained was dried and then calcined. It is hereinafter referred to as VGPF4.

Comparative Example 5: Coating Y in Combination with Coating Z

Stabilized aluminum oxide was suspended in water. The suspension thus obtained was subsequently mixed with a palladium nitrate solution and a platinum nitrate solution under constant stirring. The resulting coating suspension was used directly for coating a commercially available wall flow filter substrate, the coating being introduced into the porous filter wall over 100% of the substrate length. The total load of this filter amounted to 10 g/l; the total noble metal load amounted to 0.35 g/l with a ratio of palladium to rhodium of 12:1. The coated filter thus obtained was dried and then calcined. Aluminum oxide stabilized with lanthanum oxide was then suspended in water with a first oxygen storage component which comprised 40% by weight cerium oxide, zirconium oxide, lanthanum oxide and praseodymium oxide, and a second oxygen storage component which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was subsequently mixed with a palladium nitrate solution and a rhodium nitrate solution under constant stirring. The resulting coating suspension was used directly for coating a commercially available wall-flow filter substrate, the coating being introduced over 60% of the substrate length on the surfaces $O_A$. The total load of this filter amounted to 85 g/l; the total noble metal load amounted to 0.88 g/l with a ratio of platinum to palladium to rhodium of 92:108:50. The coated filter thus obtained was dried and then calcined. It is hereinafter referred to as VGPF5.

The filters VGPF3, VGPF4 and VGPF5 produced in this way were initially loaded with a defined amount of soot and subsequently investigated in a soot burn-off test on the engine test bench with a lean exhaust gas composition and constant temperature of 450° C. upstream of the catalyst inlet to determine their soot oxidation properties. It is found that the combination of coating Y and coating Z in VGPF5 is most suitable for completely regenerating the particulate filter. Considering the time required for the back pressure of the soot-loaded filter to drop to 25% of the original back pressure without soot (defined as p25), it can be seen in FIG. 14 that the combination of coating Y and coating Z in VGPF5 reaches the p25 value after about 1700 sec, while VGPF3 and VGPF4 reach the p25 value only after a time of 4100 and 2250 sec, respectively.

Comparative Example 6: Coating Y in Combination with Coating Z

Stabilized aluminum oxide suspended in water. The suspension thus obtained was subsequently mixed with a palladium nitrate solution and a platinum nitrate solution under constant stirring. The resulting coating suspension was used directly for coating a commercially available wall flow filter substrate, the coating being introduced into the porous filter wall over 100% of the substrate length. The total load of this filter amounted to 10 g/l; the total noble metal load amounted to 0.28 g/l with a ratio of palladium to rhodium of 12:1. The coated filter thus obtained was dried and then calcined. Aluminum oxide stabilized with lanthanum oxide was then suspended in water with an oxygen storage component which comprised 24% by weight cerium oxide, zirconium oxide, lanthanum oxide and yttrium oxide. The weight ratio of aluminum oxide and oxygen storage component was 55:45. The suspension thus obtained was subsequently mixed with a palladium nitrate solution and a rhodium nitrate solution under constant stirring. The resulting coating suspension was used directly for coating a commercially available wall-flow filter substrate, the coating being introduced over 80% of the substrate length on the surfaces $O_A$. The total load of this filter amounted to 60 g/l after the second step; the total noble metal load amounted to 0.48 g/l with a ratio of palladium to rhodium of 738:262:359. The coated filter thus obtained was dried and then calcined. It is hereinafter referred to as VGPF6.

Example 3 According to the Invention: Coating Y in Combination with Coating Z and Coating F Stabilized aluminum oxide suspended in water. The suspension thus obtained was subsequently mixed with a palladium nitrate solution and a platinum nitrate solution under constant stirring. The resulting coating suspension was used directly for coating a commercially available wall flow filter substrate, the coating being introduced into the porous filter wall over 100% of the substrate length. The total load of this filter amounted to 10 g/l; the total precious metal load amounted to 0.28 g/l with a ratio of palladium to rhodium of 12:1. The coated filter thus obtained was dried and then calcined. Aluminum oxide stabilized with lanthanum oxide was then suspended in water with an oxygen storage component which comprised 24% by weight cerium oxide, zirconium oxide, lanthanum oxide and yttrium oxide. The weight ratio of aluminum oxide and oxygen storage component was 55:45. The suspension thus obtained was subsequently mixed with a palladium nitrate solution and a rhodium nitrate solution under constant stirring. The resulting coating suspension was used directly for coating a commercially available wall-flow filter substrate, the coating being introduced over 80% of the substrate length on the surfaces $O_A$. The total load of this filter amounted to 60 g/l after the second step; the total noble metal load amounted to 0.48 g/l with a ratio of palladium to rhodium of 738:262:359. The coated filter thus obtained was dried and then calcined. Subsequently, the filter was impinged on by a dry powder/gas aerosol, wherein 4 g/L of a metal oxide was introduced into the channels E. It is hereinafter referred to as GPF3.

The two filters VGPF6 and GPF3 were investigated in the vehicle with regard to their particle filtration efficiency. For this purpose, the filters were measured in a WLTP driving cycle in a position close to the engine between two particle counters. In both cases, a three-way catalyst was located upstream in the exhaust tract, through which the lambda control of the vehicle was effected. Here the filter GPF3 according to the invention has a filtration efficiency of 96%, calculated from the particle values of the two particle counters, while the comparative filter VGPF6 achieves a filtration efficiency of only 71%.

In addition, the two filters thus obtained were measured on a cold-blast test stand in the fresh state in order to determine the pressure loss over the respective filter. At room temperature and a volumetric flow rate of 300 $m^3/h$ of air, the back pressure is 69 mbar for the VGPF6 and 122 mbar for the GPF3. As already described, the filtration coating F only leads to a moderate increase in back pressure.

Furthermore, the two filters were investigated with respect to the back pressure after soot loading. For this purpose, both filters were sooted on an engine test bench with a direct-injection turbocharged engine. For a soot amount of 3 g, the GPF3 according to the invention, despite the higher back pressure in the clean state, has a lower back pressure than the comparative filter VGPF6 (Table 3).

TABLE 3

| | Back pressure in the clean state | Back pressure with 3 g soot |
|---|---|---|
| VGPF6 | 69 | 244 |
| GPF3 | 122 | 205 |

Overall, it can be seen that the additional regeneration coating Y can be optionally combined with the filtration coating F and three-way coating Z, wherein the advantages in terms of back pressure behavior after soot loading and in terms of filtration efficiency still remain in comparison with a filter without a coating F.

The invention claimed is:

1. A wall-flow filter for removing particles from the exhaust gas of combustion engines, comprising a wall-flow filter substrate of length L and coatings Z and F that differ from one another, wherein the wall-flow filter substrate has channels E and A, which extend in parallel between a first and a second end of the wall-flow filter substrate, are separated by porous walls and form surfaces $O_E$ and $O_A$ respectively, and wherein the channels E are closed at the second end and the channels A are closed at the first end, and wherein the coating Z is located on the surfaces $O_A$ or both in the porous walls and on the surfaces $O_A$, but not on the surfaces $O_E$, and comprises palladium and/or rhodium and a cerium/zirconium mixed oxide, and wherein the coating Z extends from the second end of the wall flow-flow filter substrate to 50 to 90% of the length L, and that the coating F is located in the porous walls and/or on the surfaces $O_E$, but not on the surfaces $O_A$, and comprises a particulate metal compound and no noble metal, characterized in that the wall-flow filter substrate has a coating Y which is different from the coatings Z and F, which comprises platinum, palladium or platinum and palladium, which contains no rhodium and no cerium/zirconium mixed oxide and which is located on the surfaces $O_E$ or both in the porous walls and on the surfaces $O_E$, but not on the surfaces $O_A$, and wherein coating Y extends on the surfaces $O_E$ over a length of 100% of the length L.

2. The wall-flow filter according to claim 1, characterized in that coating Z contains palladium and rhodium.

3. The wall-flow filter according to claim 1, characterized in that coating Z does not contain platinum.

4. The wall-flow filter according to claim 1, characterized in that coating F consists of one or more particulate metal compounds.

5. The wall-flow filter according to claim 4, characterized in that the particulate metal compound of the coating F is cerium oxide, titanium dioxide, zirconium dioxide, silicon dioxide, aluminum oxide, or mixtures or mixed oxides thereof.

6. The wall-flow filter according to claim 1, characterized in that coating F is located on the surfaces $O_E$ and has a thickness less than coating Z, with the ratio of the layer thickness of coatings F to that of coating Z being 0.15 to 0.95, and the average particle diameter $d_{50}$ of coating F is smaller than that of coating Z, with the ratio of average particle diameter $d_{50}$ of coating F to that of coating Z is 0.05 to 0.9.

7. The wall-flow filter according to claim 6, characterized in that coating F has a thickness less than coating Y, with the ratio of the layer thickness of coatings F to that of coating Y being 0.15 to 0.95.

8. The wall-flow filter according to claim 1, characterized in that coating F is located on the surfaces $O_E$ and has a thickness less than coating Y, with the ratio of the layer thickness of coatings F to that of coating Y being 0.15 to 0.95, and the average particle diameter $d_{50}$ of coating F is smaller than that of coating Z, with the ratio of average particle diameter $d_{50}$ of coating F to that of coating Z is 0.05 to 0.9.

9. The wall-flow filter according to claim 1, characterized in that coating F is located on the surfaces OE and extends over a length of 100% of the length L.

10. The wall-flow filter according to claim 1, characterized in that coating F is located in the porous walls.

11. The wall-flow filter according to claim 1, characterized in that, coating Y is limited to being on the surfaces $O_E$ and not both in the porous walls and on the surfaces $O_E$.

12. The wall-flow filter according to claim 1, characterized in that, coating Z is limited to being on the surfaces $O_A$ and not both in the porous walls and on the surfaces $O_A$.

13. A wall-flow filter for removing particles from the exhaust gas of combustion engines, comprising a wall-flow filter substrate of length L and coatings Z and F that differ from one another, wherein the wall-flow filter substrate has channels E and A, which extend in parallel between a first and a second end of the wall-flow filter substrate, are separated by porous walls and form surfaces $O_E$ and $O_A$ respectively, and wherein the channels E are closed at the second end and the channels A are closed at the first end, and wherein the coating Z is located in the porous walls and/or on the surfaces $O_A$, but not on the surfaces $O_E$, and comprises palladium and/or rhodium and a cerium/zirconium mixed oxide, and that the coating F is located in the porous walls and/or on the surfaces $O_E$, but not on the surfaces $O_A$, and comprises a particulate metal compound and no noble metal, characterized in that the wall-flow filter substrate has a coating Y which is different from the coatings Z and F, which comprises platinum, palladium or platinum and palladium, which contains no rhodium and no cerium/zirconium mixed oxide and which is located in the porous walls and/or on the surfaces $O_E$, but not on the surfaces $O_A$, wherein the cerium/zirconium mixed oxide of coating Z contains one or more rare earth metal oxides, and wherein the rare earth metal oxide is lanthanum oxide, yttrium oxide, praseodymium oxide, neodymium oxide and/or samarium oxide.

14. The wall-flow filter according to claim 13, characterized in that coating Z comprises lanthanum-stabilized aluminum oxide as a carrier material for the rhodium, palladium or palladium and rhodium, and the cerium/zirconium/rare earth metal mixed oxide contains yttrium oxide and lanthanum oxide as rare earth metal oxides.

15. The wall-flow filter according to claim 13, characterized in that coating Z comprises lanthanum-stabilized aluminum oxide as a carrier material for the rhodium, palladium or palladium and rhodium, and the cerium/zirconium/rare earth metal mixed oxide contains praseodymium oxide and lanthanum oxide as rare earth metal oxides.

16. The wall-flow filter according to claim 13, characterized in that coating F is a dry impinged dry powder coating on the surfaces $O_E$, and relative to coatings F, Y and Z, only coating F is an on surface coating on surface $O_E$.

17. The wall-flow filter according to claim 13, characterized in that, coating Y extends over 100% of length L, and coating F is an applied dry metal oxide located on the surfaces $O_E$ and is of a layer thickness less than a layer thickness of coating Z.

18. A wall-flow filter for removing particles from the exhaust gas of combustion engines, comprising a wall-flow filter substrate of length L and coatings Z and F that differ from one another, wherein the wall-flow filter substrate has channels E and A, which extend in parallel between a first and a second end of the wall-flow filter substrate, are separated by porous walls and form surfaces $O_E$ and $O_A$ respectively, and wherein the channels E are closed at the second end and the channels A are closed at the first end, and wherein the coating Z is located in the porous walls and/or on the surfaces $O_A$, but not on the surfaces $O_E$, and comprises palladium and/or rhodium and a cerium/zirconium mixed oxide, and that the coating F is located in the porous walls and/or on the surfaces $O_E$, but not on the surfaces $O_A$, and comprises a particulate metal compound and no noble metal, characterized in that the wall-flow filter substrate has a coating Y which is different from the coatings Z and F, which comprises platinum, palladium or platinum and palladium, which contains no rhodium and no cerium/zirconium mixed oxide and which is located in the porous walls and/or on the surfaces $O_E$, but not on the surfaces $O_A$, and wherein coating F has an increasing concentration gradient in the longitudinal direction of the filter from its first to its second end.

19. The wall-flow filter according to claim 18, characterized in that, relative to coatings F, Y and Z, only coating F is on surface $O_E$.

20. A method for producing a wall-flow filter according to claim 1, characterized in that the channels E of the wall-flow filter substrate already coated with coating Z and coating Y are impinged on by a dry powder/gas aerosol, wherein the powder contains a particulate metal compound.

21. A method of reducing harmful exhaust gases of an internal combustion engine, comprising passing the harmful exhaust gases of the internal combustion engine through a wall-flow filter according to claim 1.

* * * * *